US008171308B2

(12) United States Patent
Choi et al.

(10) Patent No.: US 8,171,308 B2
(45) Date of Patent: May 1, 2012

(54) DIGITAL BROADCASTING SYSTEM AND METHOD OF PROCESSING DATA IN DIGITAL BROADCASTING SYSTEM

(75) Inventors: In Hwan Choi, Gyeonggi-do (KR); Chul Soo Lee, Seoul (KR); Sang Kil Park, Seoul (KR)

(73) Assignee: LG Electronics Inc., Seoul (KR)

( * ) Notice: Subject to any disclaimer, the term of this patent is extended or adjusted under 35 U.S.C. 154(b) by 891 days.

(21) Appl. No.: 12/235,584

(22) Filed: Sep. 22, 2008

(65) Prior Publication Data

US 2009/0080574 A1 Mar. 26, 2009

Related U.S. Application Data

(60) Provisional application No. 60/974,084, filed on Sep. 21, 2007, provisional application No. 60/977,379, filed on Oct. 4, 2007, provisional application No. 61/044,504, filed on Apr. 13, 2008, provisional application No. 61/050,629, filed on May 6, 2008, provisional application No. 61/076,686, filed on Jun. 29, 2008.

(30) Foreign Application Priority Data

Sep. 19, 2008 (KR) .................. 10-2008-0092440

(51) Int. Cl.
*G06F 11/30* (2006.01)
*H04W 4/00* (2009.01)
(52) U.S. Cl. ........ 713/189; 370/329; 370/535; 455/3.02
(58) Field of Classification Search .................. 370/329, 370/535; 455/3.02
See application file for complete search history.

(56) References Cited

U.S. PATENT DOCUMENTS 6,816,204 B2 11/2004 Limberg
2007/0121681 A1 5/2007 Kang et al.
2007/0206590 A1 9/2007 Baek et al.

OTHER PUBLICATIONS

ETSI EN 300 401 V1.4.1, DAB to mobile, portable and fixed receivers, Jun. 2006.
ISO/IEC 13818-1, second edition, Information technology—Generic coding of moving pictures and associated audio information: Systems, Dec. 1, 2000.
ETSI TS 102 367 V1.1.1, Digital Audio Broadcasting (DAB); Conditional access, Jan. 2005.
Federal Information Processing Standards Publication 197, Advanced Encryption Standard (AES). Nov. 26, 2001.
ETSI ETR 289, Support for use of scrambling and Conditional Access (CA) within digital broadcasting systems, Oct. 1996.
DVB Document A092 Rev. 2, DVB-H Implementation Guidelines, May 2007.

*Primary Examiner* — Jacob Lipman
(74) *Attorney, Agent, or Firm* — Lee, Hong, Degerman, Kang & Waimey

(57) ABSTRACT

A digital broadcast receiver and a control method thereof are disclosed. The control method includes receiving a broadcast signal into which mobile service data and main service data are multiplexed, extracting transmission parameter channel (TPC) signaling information and fast information channel (FIC) signaling information from a data group in the received mobile service data, acquiring control data required to decrypt an encrypted service included in an ensemble by using the extracted FIC signaling information, the ensemble being a virtual channel group of the received mobile service data, and controlling such that the encrypted service is decrypted by using the acquired control data.

12 Claims, 32 Drawing Sheets

FIG. 15

| Syntax | # of bits |
|---|---|
| FIC_Segment () { | |
|   FIC_type | 2 |
|   Reserved | 5 |
|   error_indicator | 1 |
|   FIC_seg_number | 4 |
|   FIC_last_seg_number | 4 |
|   for (i=0;i<N;i++) { | |
|     data_byte | 8 |
|   } | |
| } | |

FIG. 16

| | Syntax | # of bits |
|---|---|---|
| A first region | if (FIC_seg_number == 0) { | |
| |   current_next_indicator | 1 |
| |   Reserved | 2 |
| |   ESG_version | 5 |
| |   transport_stream_id | 16 |
| | } | |
| A second region | while ( ensemble_id != 0xFF ) | |
| |   ensemble_id | 8 |
| |   reserved | 3 |
| |   SI_version | 5 |
| |   num_channel | 3 |
| A third region |   for (i=0;i< num_channel;i++) { | |
| |     channel_type | 5 |
| |     channel_activity | 2 |
| |     CA_indicator | 1 |
| |     Stand_alone_Servce_indicator | |
| |     major_channel_num | 8 |
| |     minor_channel_num | 8 |
| |   } | |
| | } // end of while | |
| | } | |

FIG. 17

| Syntax | No. of Bits | Format |
|---|---|---|
| service_map_table_section() { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   reserved | 3 | '111' |
|   version_number | 5 | uimsbf |
|   section_number | 8 | uimsbf |
|   last_section_number | 8 | uimsbf |
|   SMT_protocol_version | 8 | uimsbf |
|   ensemble_id | 8 | uimsbf |
|   num_channels | 8 | uimsbf |
|   for (i=0; i<num_channels; i++) | | |
|   { | | |
|     major_channel_number | 8 | uimsbf |
|     minor_channel_number | 8 | uimsbf |
|     short_channel_name | 8*8 | |
|     service_id | 16 | uimsbf |
|     service_type | 6 | uimsbf |
|     virtual_channel_activity | 2 | uimsbf |
|     num_components | 5 | uimsbf |
|     IP_version_flag | 1 | bslbf |
|     source_IP_address_flag | 1 | bslbf |
|     virtual_channel_target_IP_address_flag | 1 | bslbf |
|     if (source_IP_address_flag) | | |
|       source_IP_address | 32 or 128 | uimsbf |
|     if (virtual_channel_target_IP_address_flag) | | |
|       virtual_channel_target_IP_address | 32 or 128 | uimsbf |
|     for (j=0; j<num_components; j++) | | |
|     { | | |
|       RTP_payload_type | 7 | uimsbf |
|       component_target_IP_address_flag | 1 | bslbf |
|       if (component_target_IP_address_flag) | | |
|         component_target_IP_address | 32 or 128 | uimsbf |
|       reserved | 2 | '11' |
|       port_num_count | 6 | uimsbf |
|       target_UDP_port_num | 16 | uimsbf |
|       descriptors_length | 8 | uimsbf |
|       for (k=0; k<descriptors_length; k++) | | |
|       { | | |
|         component_level_descriptor() | | |
|       } | | |
|     } | | |
|     descriptors_length | 8 | uimsbf |
|     for (m=0; m<descriptors_length; m++) | | |
|     { | | |
|       virtual_channel_level_descriptor() | | |
|     } | | |
|   } | | |
|   descriptors_length | 8 | uimsbf |
|   for (n=0; n<descriptors_length; n++) { | | |
|   { | | |
|     ensemble_level_descriptor() | | |
|   } ensemble_level_descriptor() | | |
| } | | |

FIG. 18

| Syntax | No. of Bits | Format |
|---|---|---|
| MH_audio_descriptor() { | | |
|     descriptor_tag | 8 | TBD |
|     descriptor_length | 8 | uimsbf |
|     channel_configuration | 8 | uimsbf |
|     reserved | 5 | '11111' |
|     sample_rate_code | 3 | uimsbf |
|     reserved | 2 | '11' |
|     bit_rate_code | 6 | uimsbf |
|     ISO_639_language_code | 3*8 | uimsbf |
| } | | |

FIG. 19

| Syntax | No. of Bits | Format |
|---|---|---|
| MH_RTP_payload_type_descriptor() { | | |
|     descriptor_tag | 8 | TBD |
|     descriptor_length | 8 | uimsbf |
|     reserved | 1 | '1' |
|     RTP_payload_type | 7 | uimsbf |
|     MIME_type_length | 8 | uimsbf |
|     MIME_type() | var | |
| } | | |

FIG. 20

| Syntax | No. of Bits | Format |
|---|---|---|
| MH_current_event_descriptor() { | | |
|     descriptor_tag | 8 | TBD |
|     descriptor_length | 8 | uimsbf |
|     current_event_start_time | 4*8 | uimsbf |
|     current_event_duration | 3*8 | uimsbf |
|     Title_length | 8 | uimsbf |
|     Title_text() | var | |
| } | | |

FIG. 21

| Syntax | No. of Bits | Format |
|---|---|---|
| MH_next_event_descriptor() { | | |
|     descriptor_tag | 8 | TBD |
|     descriptor_length | 8 | uimsbf |
|     next_event_start_time | 4*8 | uimsbf |
|     next_event_duration | 3*8 | uimsbf |
|     title_length | 8 | uimsbf |
|     title_text() | var | |
| } | | |

FIG. 22

| Syntax | No. of Bits | Format |
|---|---|---|
| MH_system_time_descriptor() { | | |
|     descriptor_tag | 8 | TBD |
|     descriptor_length | 8 | uimsbf |
|     system_time | 32 | uimsbf |
|     GPS_UTC_offset | 8 | uimsbf |
|     time_zone_offset_polarity_rate_code | 1 | bslbf |
|     time_zone_offset | 31 | uimsbf |
|     daylight_savings() | 16 | uimsbf |
|     time_zone() | 5*8 | |
| } | | |

FIG. 27

| Syntax | No. of Bits | Format |
|---|---|---|
| FIC_Segment () { <br>  FIC_TYPE <br>  if (FIC_TYPE == "01"){ <br>    Reserved_for_future <br>    CA_ID <br>  } <br>  else { <br>    Reserved_for_future <br>  } <br>  ERROR_INDICATOR <br>  FIC_SEG_NUMBER <br>  FIC_LAST_SEG_NUMBER <br>  if (FIC_SEG_NUMBER == 0) { <br>    CURRENT_NEXT_INDICATOR <br>    Reserved_for_future <br>    VERSION_NUMBER <br>    TRANSPORT_STREAM_ID <br>  } <br>  for (i=0; i<N; i++) { <br>    data_byte <br>  } <br> } | <br><br>2<br><br>1<br>4<br><br><br>5<br><br>1<br>4<br>4<br><br>1<br>2<br>5<br>16<br><br><br>8 | |

FIG. 28

| Syntax | No. of Bits | Format |
|---|---|---|
| SIGNALING_PAYLOAD_FORMAT { <br>  for (i=0; i<Number_of_Ensemble; i++) { <br>    ENSEMBLE_ID <br>    if (ENSEMBLE_ID != 0xFF) { <br>      Reserved_for_future <br>      SI_VERSION <br>      NUM_CHANNEL <br>      for (i=0; i<NUM_CHANNEL; i++) { <br>        CHANNEL_TYPE (StandAloneService) <br>        CHANNEL_ACTIVITY <br>        CA_INDICATOR <br>        if (CA_INDICATOR == 1) { <br>          EMM_CA_ID <br>          ECM_CA_ID <br>        } <br>        MAJOR_CH_NUM <br>        MINOR_CH_NUM <br>      } <br>    } else if (ENSEMBLE_ID == 0xFF) { <br>      This is end of payload <br>    } <br>  } <br>} | <br><br>8<br><br>3<br>5<br>8<br><br>5<br>2<br>1<br><br>4<br>4<br><br>8<br>8 | |

FIG. 30

| FIC_type = "00" | Reserved = "11111" | Error_indicator = "0" | FIC_SEG_Number = "0000" | FIC_Last_SEG_Number = "0000" | Current_Next_Indicator = "1" | Reserved = "11" | Version_Number = "00000" | Transport_Stream_ID = 0x0001 |

| Ensemble_ID = 0x00 | Reserved = "111" | SI_version = "00000" | NUM_channel = 0x01 | Channel_type = "00110" | Channel_activity = "01" | CA_indicator = "0" | Major_CH_NUM = 0x1E | Minor_CH_NUM = 0x63 |

| Ensemble_ID = 0x01 | Reserved = "111" | SI_version = "00000" | NUM_channel = 0x02 | Channel_type = "00001" | Channel_activity = "01" | CA_indicator = "1" | EMM_CA_ID = 0x0 | ECM_CA_ID = 0x5 | Major_CH_NUM = 0x1E | Minor_CH_NUM = 0x05 |
| | | | | Channel_type = "00001" | Channel_activity = "01" | CA_indicator = "1" | EMM_CA_ID = 0x0 | ECM_CA_ID = 0x6 | Major_CH_NUM = 0x1E | Minor_CH_NUM = 0x06 |

| Ensemble_ID = 0x02 | Reserved = "111" | SI_version = "00000" | NUM_channel = 0x02 | Channel_type = "00011" | Channel_activity = "01" | CA_indicator = "0" | Major_CH_NUM = 0x1E | Minor_CH_NUM = 0x07 |
| | | | | Channel_type = "00001" | Channel_activity = "01" | CA_indicator = "0" | Major_CH_NUM = 0x1E | Minor_CH_NUM = 0x08 |

FIG. 33

| FIC_type ="01" | Reserved ="1" | CA_ID ="0000" | Error_indicator ="0" | FIC_SEG_Number ="0000" | FIC_LAST_SEG_Number ="0000" | CURRENT_NEXT_Indicator ="1" | Reserved ="11" | Version_Number ="00000" | Transport_Stream_ID =ox0001 |
|---|---|---|---|---|---|---|---|---|---|

Data bytes (for EMM)

| FIC_type ="01" | Reserved ="1" | CA_ID ="0101" | Error_indicator ="0" | FIC_SEG_Number ="0000" | FIC_LAST_SEG_Number ="0000" | CURRENT_NEXT_Indicator ="1" | Reserved ="11" | Version_Number ="00000" | Transport_Stream_ID =ox0001 |
|---|---|---|---|---|---|---|---|---|---|

Data bytes (for ECM)

FIG. 34
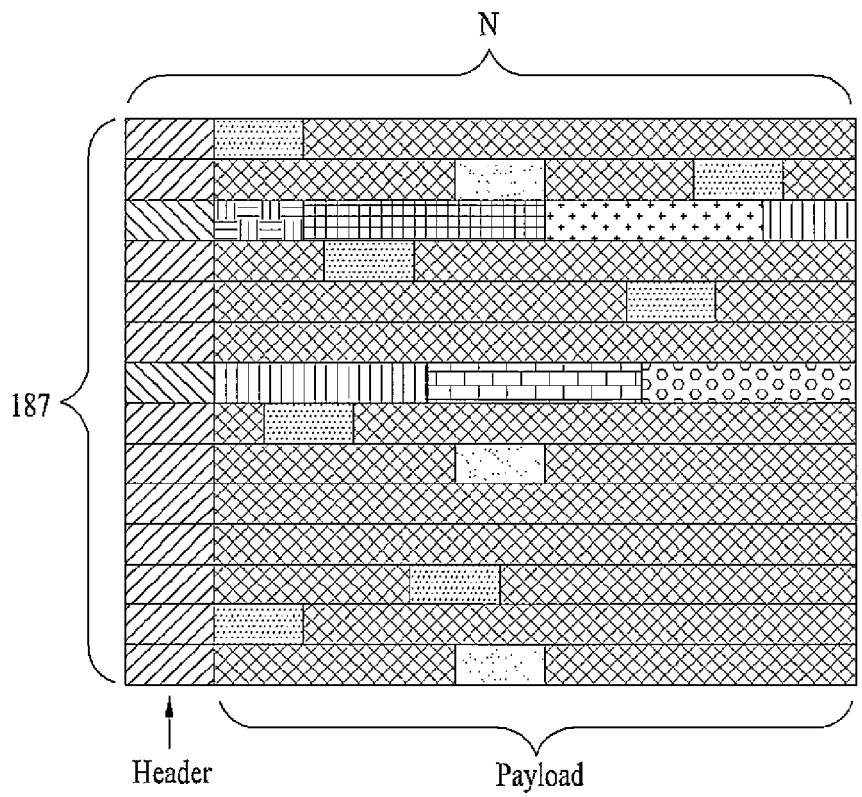
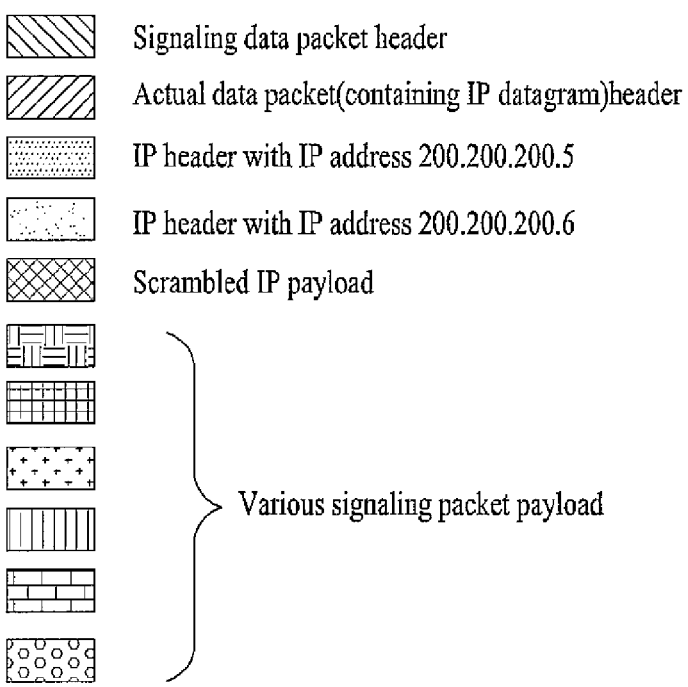

DIGITAL BROADCASTING SYSTEM AND METHOD OF PROCESSING DATA IN DIGITAL BROADCASTING SYSTEM

This application claims the priority benefit of Korean Application No. 10-2008-0092440, filed on Sep. 19, 2008, which is hereby incorporated by reference as if fully set forth therein.

This application claims the benefit of U.S. Provisional Application No. 60/974,084, filed on Sep. 21, 2007, U.S. Provisional Application No. 60/977,379, filed on Oct. 4, 2007, U.S. Provisional Application No. 61/044,504, filed on Apr., 13, 2008, U.S. Provisional Application No. 61/050,629, filed on May 6, 2008, and U.S. Provisional Application No. 61/076,686, filed on Jun. 29, 2008, which are hereby incorporated by reference.

BACKGROUND OF THE INVENTION

1. Field of the Invention

The present invention relates to a digital broadcasting system, and more particularly, to a digital broadcast receiving system and a method for controlling the same.

2. Discussion of the Related Art

A digital broadcasting system is configured of a digital broadcast transmitting system (or transmitter) and a digital broadcast receiving system (or receiver). Also, the digital broadcast transmitting system digitally processes data, such as broadcast programs, and transmits the processed data to the digital broadcast receiving system. Due to its various advantages, such as efficient data transmission, the digital broadcasting system is gradually replacing the conventional analog broadcasting systems.

However, the Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

Moreover, in a conventional mobile digital broadcasting environment, it is the current reality that there is no concrete technology for setting or releasing a conditional access to a specific service.

SUMMARY OF THE INVENTION

Accordingly, the present invention is directed to a digital broadcast receiver and a control method thereof that substantially obviates one or more problems due to limitations and disadvantages of the related art.

An object of the present invention is to provide a digital broadcast receiver which is robust against a channel variation and noise, and a control method thereof.

Another object of the present invention is to provide a data processing method which is capable of setting or releasing a conditional access to a specific service in a mobile digital broadcasting environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a digital broadcast receiver includes: receiving a broadcast signal into which mobile service data and main service data are multiplexed; extracting transmission parameter channel (TPC) signaling information and fast information channel (FIC) signaling information from a data group in the received mobile service data; acquiring control data required to decrypt an encrypted service included in an ensemble, using the extracted FIC signaling information, the ensemble being a virtual channel group of the received mobile service data; and controlling such that the encrypted service is decrypted, using the acquired control data.

In another aspect of the present invention, a digital broadcast receiver includes: a reception unit for receiving a broadcast signal into which mobile service data and main service data are multiplexed; an extractor for extracting transmission parameter channel (TPC) signaling information and fast information channel (FIC) signaling information from a data group in the received mobile service data; an acquirer for acquiring control data required to decrypt an encrypted service included in an ensemble, using the extracted FIC signaling information, the ensemble being a virtual channel group of the received mobile service data; and a controller for controlling such that the encrypted service is decrypted, using the acquired control data.

In a further aspect of the present invention, a control method of a digital broadcast transmitter includes: generating control data required to decrypt an encrypted service included in an ensemble that is a virtual channel group of mobile service data; and transmitting the generated control data over an FIC, wherein each parade carrying the ensemble and control data corresponding to the parade are carried over the same time slot.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 15 illustrates an exemplary bit stream syntax structure with respect to an FIC segment according to an embodiment of the present invention.

FIG. 16 illustrates an exemplary bit stream syntax structure with respect to a payload of an FIC segment according to the present invention, when an FIC type field value is equal to '0'.

FIG. 17 illustrates an exemplary bit stream syntax structure of a service map table according to the present invention.

FIG. 18 illustrates an exemplary bit stream syntax structure of an MH audio descriptor according to the present invention.

FIG. 19 illustrates an exemplary bit stream syntax structure of an MH RTP payload type descriptor according to the present invention.

FIG. 20 illustrates an exemplary bit stream syntax structure of an MH current event descriptor according to the present invention.

FIG. 21 illustrates an exemplary bit stream syntax structure of an MH next event descriptor according to the present invention.

FIG. 22 illustrates an exemplary bit stream syntax structure of an MH system time descriptor according to the present invention.

FIG. 27 is a view showing a data structure of an FIC segment according to one embodiment of the present invention.

FIG. 28 is a view showing a payload in a data structure of an FIC segment according to one embodiment of the present invention.

FIG. 30 is a detailed view of FIC signaling information according to one embodiment of the present invention.

FIG. 33 is a view showing an example of control data extracted through the time slicing process of FIG. 32.

FIG. 34 is a view showing an RS frame extracted from a parade when an ensemble ID shown in FIG. 32 is 1.

Figure 36:
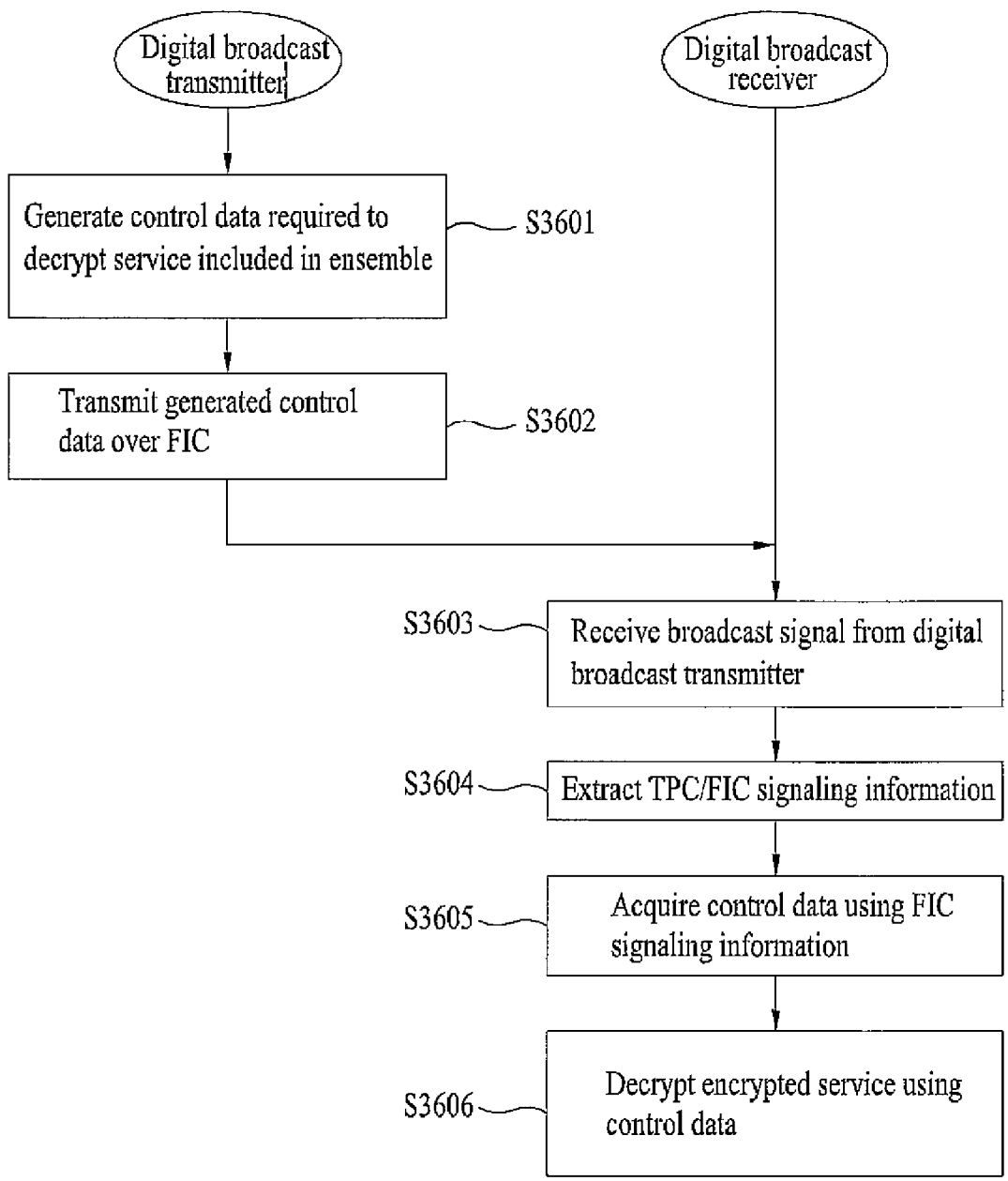

And, FIG. 36 is a flowchart illustrating a control method of a digital broadcast receiver and digital broadcast transmitter according to one embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data corresponds to data pre-known in accordance with a pre-arranged agreement between the receiving system and the transmitting system. Additionally, among the terms used in the present invention, "MH" corresponds to the initials of "mobile" and "handheld" and represents the opposite concept of a fixed-type system. Furthermore, the MH service data may include at least one of mobile service data and handheld service data, and can also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the mobileservice data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

Figure 1:
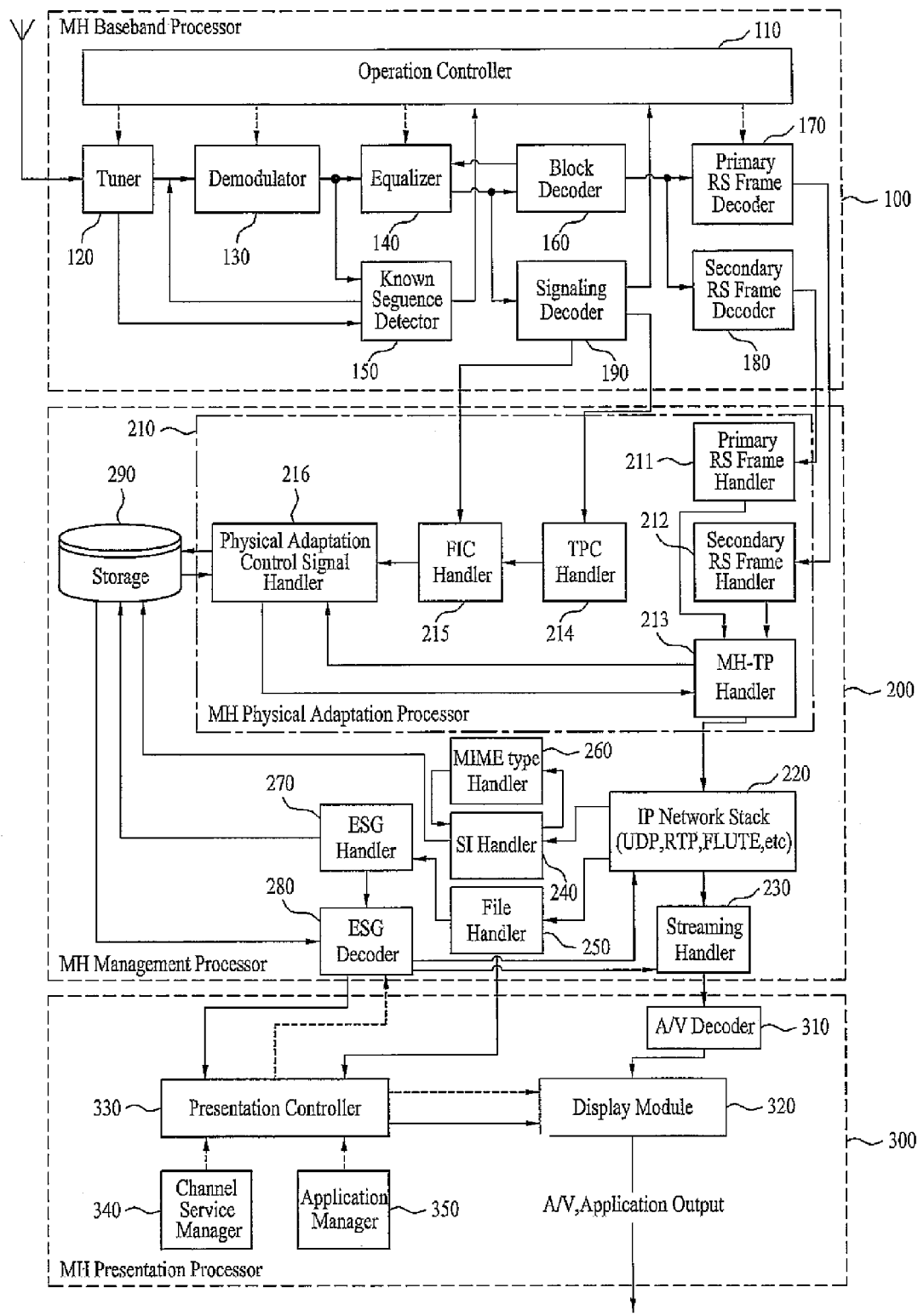
FIG. 1 illustrates a block diagram showing a structure of a digital broadcasting receiving system according to an embodiment of the present invention.

FIG. 1 illustrates a block diagram showing a structure of a digital broadcasting receiving system according to an embodiment of the present invention. The digital broadcast receiving system according to the present invention includes a baseband processor 100, a management processor 200, and a presentation processor 300. The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier wave recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier wave recovery, thereby enhancing the demodulating performance. The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feed-back on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decodes signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data. The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290. The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216. The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data is transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number. Herein, the MH ensemble ID indicates an identification number of each MH ensemble carried in the corresponding physical channel. The MH sub-frame number signifies a number identifying the MH sub-frame number in oneMH frame, wherein each MH group associated with the corresponding MH ensemble is transmitted. The TNOG represents the total number of MH groups including all of the MH groups belonging to all MH parades included in oneMH sub-frame. The RS frame continuity counter indicates a number that serves as a continuity indicator of the RS frames carrying the corresponding MH ensemble. Herein, the value of the RS frame continuity counter shall be incremented by 1 modulo 16 for each successive RS frame. N represents the column size of an RS frame belonging to the corresponding MH ensemble. Herein, the value of N determines the size of each MH TP. Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data. The FIC handler 215 processes the FIC data by associating the FIC data received from the baseband processor 100 with the TPC data. The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213. The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213. The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data. The file handler 250 receives data from the IP network stack 220 in an object format in accordance with the ALC/LCT and FLUTE structures. The file handler 250 groups the received data to create a file format. Herein, when the corresponding file includes ESG (Electronic Service Guide), the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280. The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user. The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen. The presentation controller 330 corresponds to a controller managing modules that output data received by the receiving system to the user. The channel service manager 340 manages an interface with the user, which enables the user to use channel-based broadcast services, such as channel map management, channel service connection, and so on. The application manager 350 manages an interface with a user using ESG display or other application services that do not correspond to channel-based services.

Figure 2:
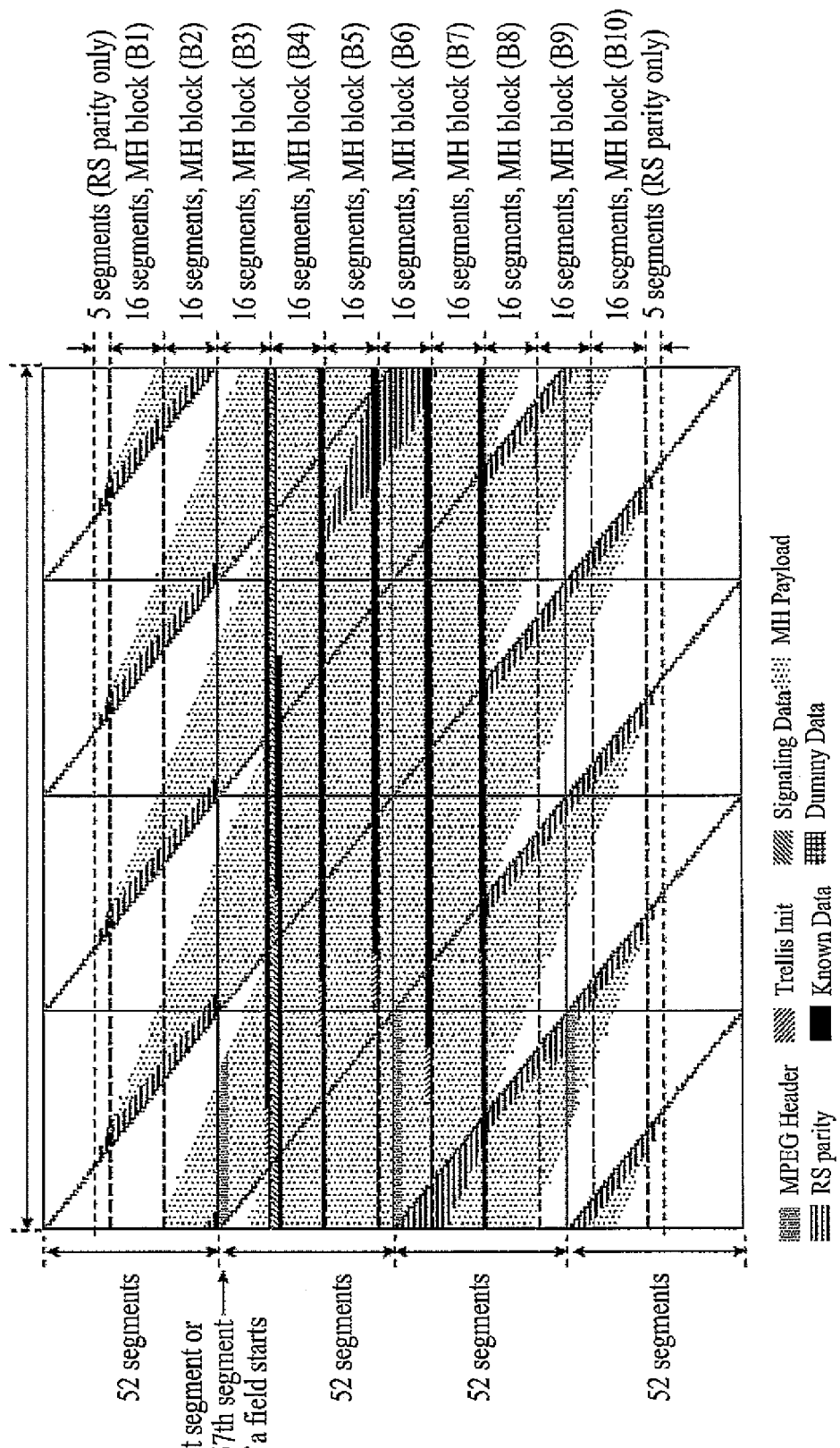
FIG. 2 illustrates an exemplary structure of a data group according to the present invention.

Meanwhile, the data structure used in the mobile broadcasting technology according to the embodiment of the present invention may include a data group structure and an RS frame structure, which will now be described in detail. FIG. 2 illustrates an exemplary structure of a data group according to the present invention. FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group. More specifically, when it is assumed that one data group is divided into regions A, B, C, and D, each MH block may be included in any one of region A to region D depending upon the characteristic of each MH block within the data group (For example, the characteristic of each MH block can be an interference level of main service data).

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, region A may have the strongest equalizing performance among region A, B, C and D.

In the example of the data group shown in FIG. 2, MH block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained) in region B.

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)". Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10) Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the 1st segment of the 4th MH block (B4) to a portion of the 2nd segment. According to an embodiment of the present invention, the signaling information area for inserting signaling information may start from the 1st segment of the 4th MH block (B4) to a portion of the 2nd segment. More specifically, 276(=207+69) bytes of the 4th MH block (B4) in each data group are assigned as the signaling information area. In other words, the signaling information area consists of 207 bytes of the 1st segment and the first 69 bytes of the 2nd segment of the 4th MH block (B4). The 1st segment of the 4th MH block (B4) corresponds to the 17th or 173rd segment of a VSB field.

Herein, the signaling information may be identified by two different types of signaling channels: a transmission parameter channel (TPC) and a fast information channel (FIC). Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the 3rd MH block (B3), and the second known data sequence is inserted in the 2nd and 3rd segments of the 4th MH block (B4). Furthermore, the 3rd to 6th known data sequences are respectively inserted in the last 2 segments of each of the 4th, 5th, 6th, and 7th MH blocks (B4, B5, B6, and B7). The 1st and 3rd to 6th known data sequences are spaced apart by 16 segments.

Figure 3:
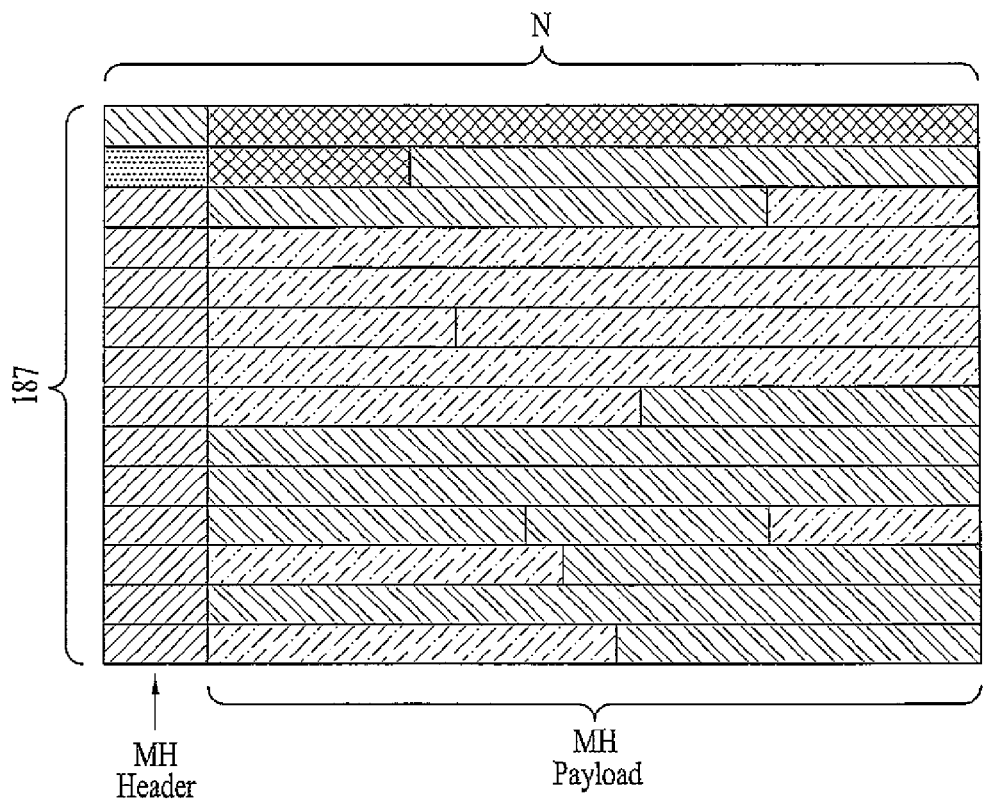
FIG. 3 illustrates an RS frame according to an embodiment of the present invention.

FIG. 3 illustrates an RS frame according to an embodiment of the present invention. The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes each service or IP streams of ESG, and SMT section data may exist in all RS frames. The RS frame according to the embodiment of the present invention consists of at least one MH transport packet (TP). Herein, the MH TP includes an MH header and an MH payload.

The MH payload may include mobile service data as wekk as signaling data. More specifically, an MH payload may include only mobile service data, or may include only signaling data, or may include both mobile service data and signaling data. According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data. In the example shown in FIG. 3, the RS frame is assigned with IP datagrams (for example, IP datagram 1 and IP datagram 2) for two service types.

Figure 4:
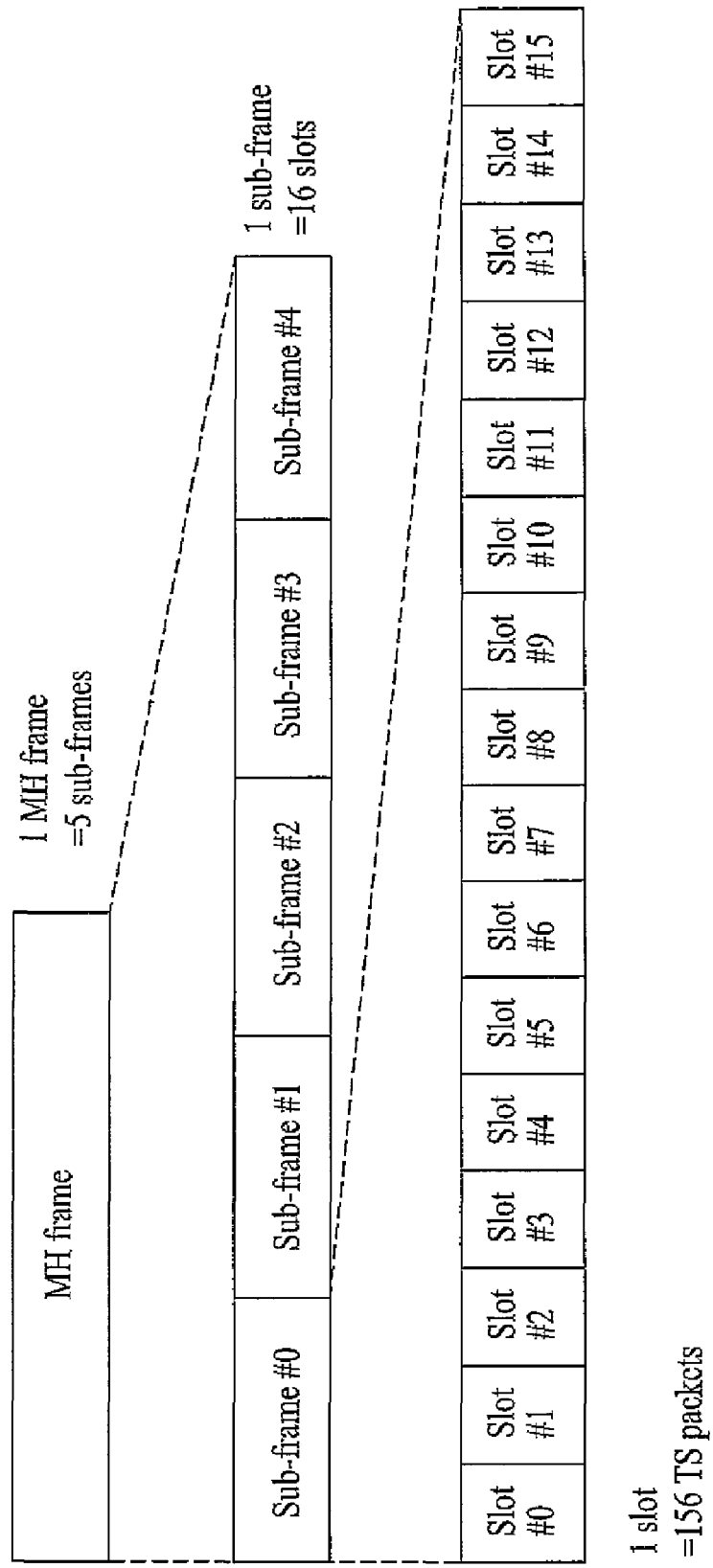
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as one data segment, a data packet prior to being interleaved may also be used as a data segment. At this point, two VSB fields are grouped to form a VSB frame.

Figure 5:
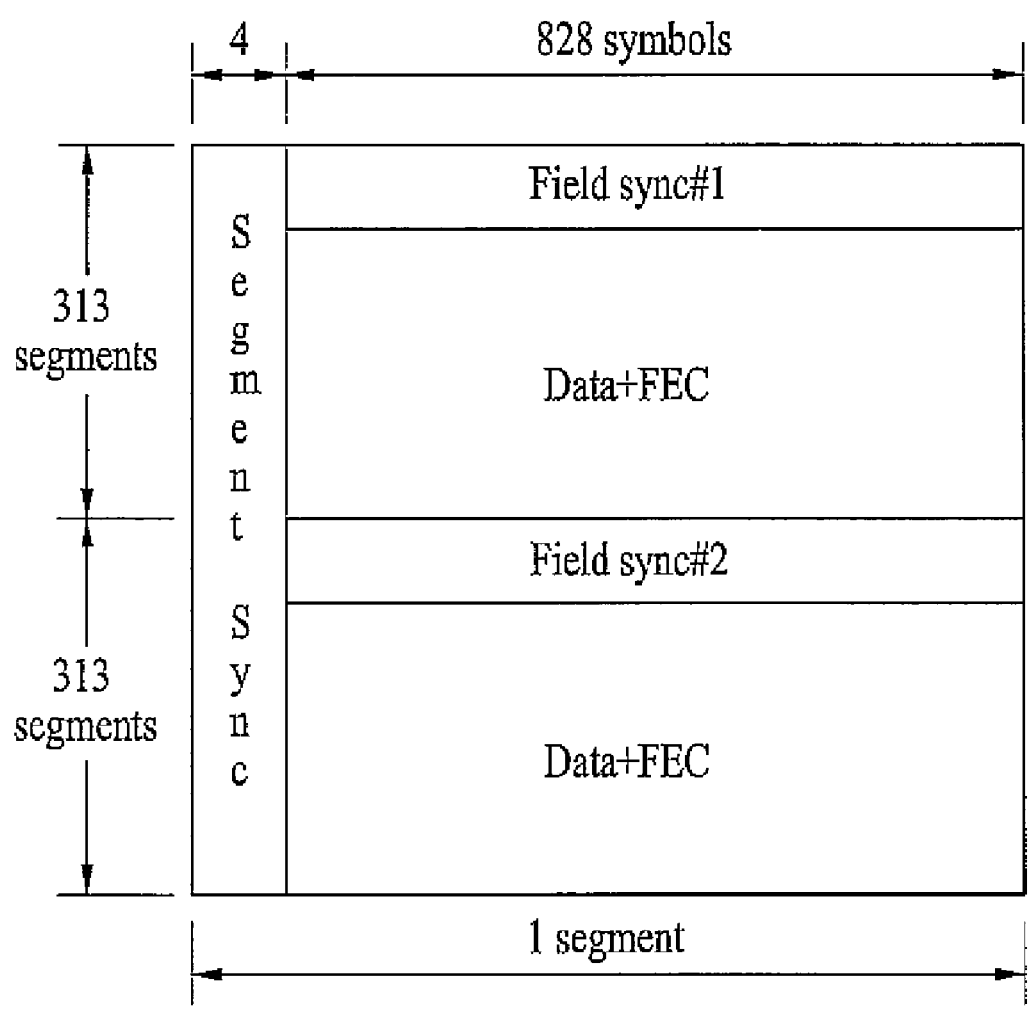
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets. Meanwhile, when the slots are assigned to a VSB frame, an off-set exists for each assigned position.

Figure 6:
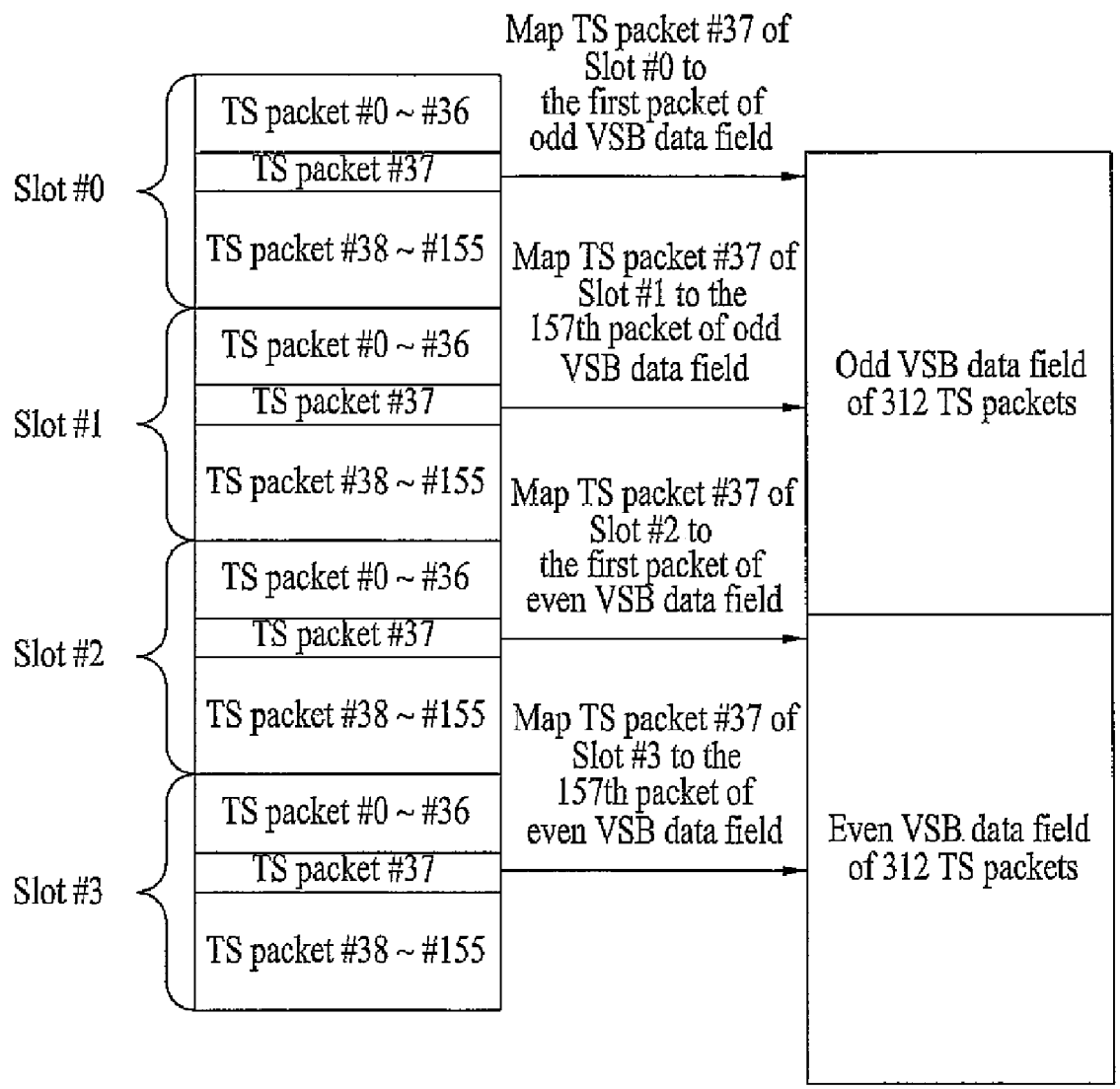
FIG. 6 illustrates a example of mapping positions of the first 4 slots of a sub-frame in a spatial area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area.

Figure 7:
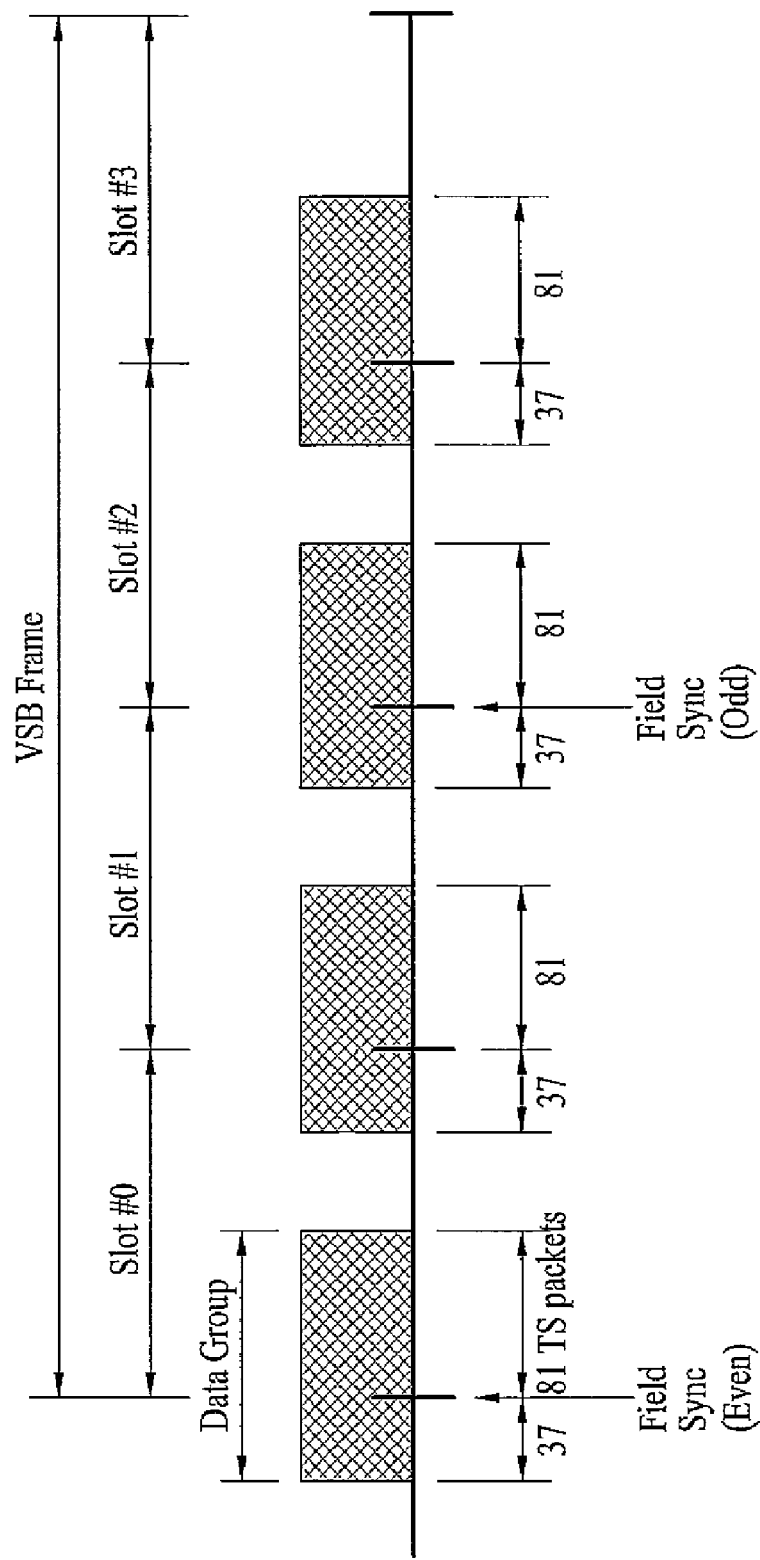
FIG. 7 illustrates a example of mapping positions of the first 4 slots of a sub-frame in a chronological (or time) area with respect to a VSB frame.

Referring to FIG. 6 and FIG. 7, a 38th data packet (TS packet #37) of a 1st slot (Slot #0) is mapped to the 1st data packet of an odd VSB field. A 38th data packet (TS packet #37) of a 2nd slot (Slot #1) is mapped to the 157th data packet of an odd VSB field. Also, a 38th data packet (TS packet #37) of a 3rd slot (Slot #2) is mapped to the 1st data packet of an even VSB field. And, a 38th data packet (TS packet #37) of a 4th slot (Slot #3) is mapped to the 157th data packet of an even VSB field. Similarly, the remaining 12 slots within the corresponding sub-frame are mapped in the subsequent VSB frames using the same method.

Figure 8:
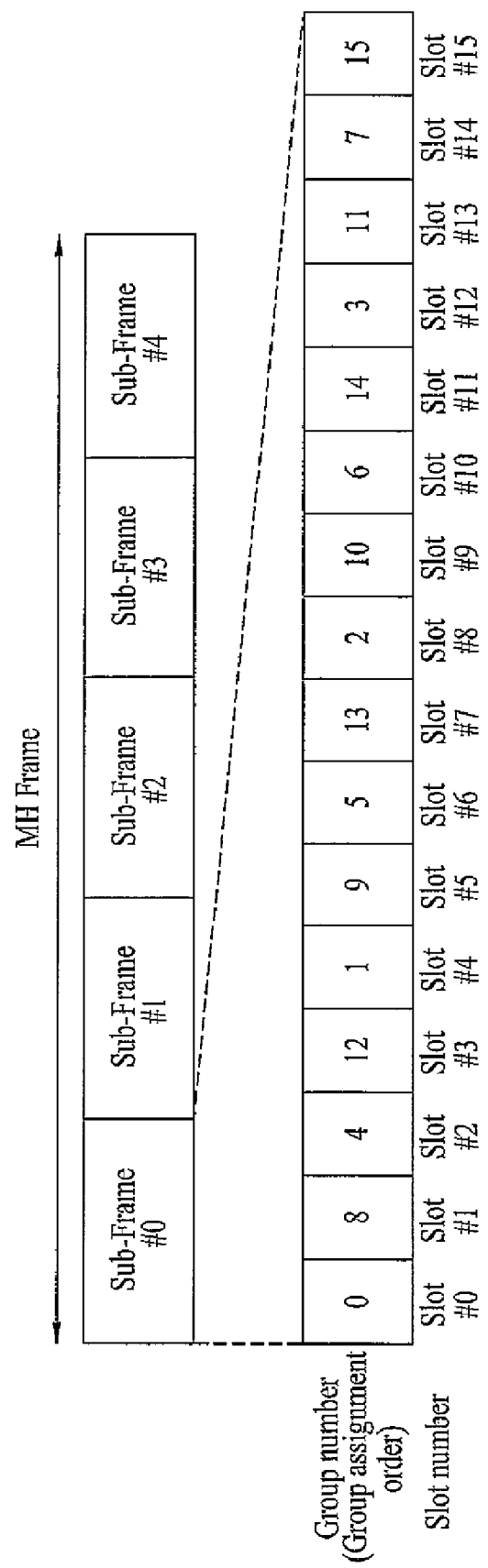
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'. According to the embodiment of the present invention, a plurality of consecutive data groups is assigned to be spaced as far apart from one another as possible within the sub-frame. Thus, the system can be capable of responding promptly and effectively to any burst error that may occur within a sub-frame.

For example, when it is assumed that 3 data groups are assigned to a sub-frame, the data groups are assigned to a 1st slot (Slot #0), a 5th slot (Slot #4), and a 9th slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j = (4i + O) \bmod 16 \qquad \text{Equation 1}$$

Herein, O=0 if i<4,
O=2 else if i<8,
O=1 else if i<12,
O=3 else.

Herein, j indicates the slot number within a sub-frame. The value of j may range from 0 to 15. Also, variable i indicates the data group number. The value of i may range from 0 to 15.

In the present invention, a collection of data groups included in a MH frame will be referred to as a "parade". Based upon the RS frame mode, the parade transmits data of at least one specific RS frame. The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode | Description |
| --- | --- |
| 00 | There is only a primary RS frame for all Group Regions |
| 01 | There are two separate RS frames<br>Primary RS frame for Group Region A and B<br>Secondary RS frame for Group Region C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame. According to the embodiment of the present invention, the parades may be assigned differently for each sub-frame and identically for all sub-frames within an MH frame. However, according to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
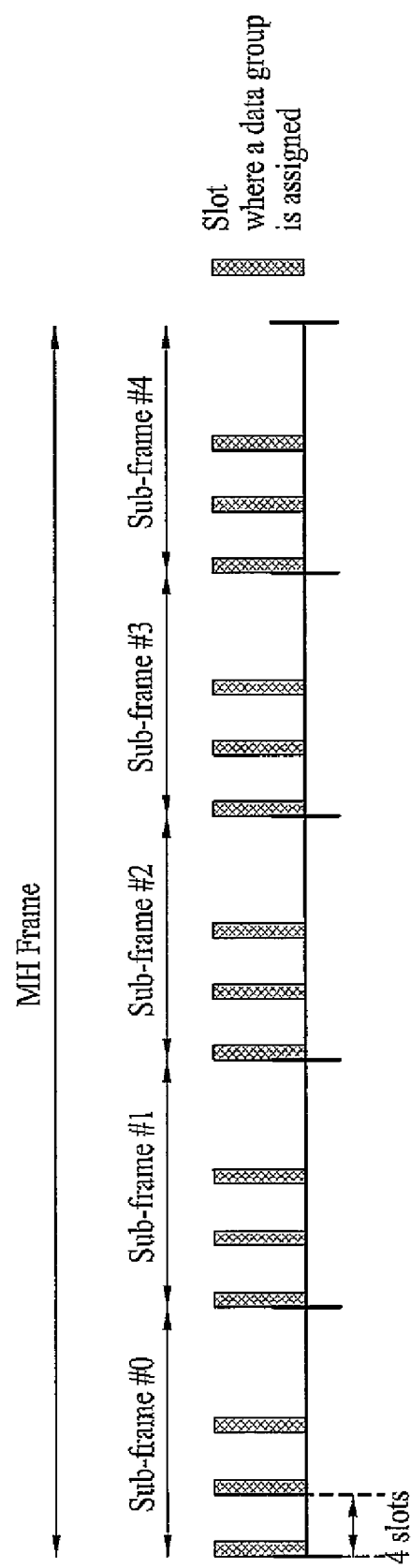
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a single parade, wherein the number of data groups included in a sub-frame is equal to '3', being allocated to an MH frame. Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total RS code word length. Meanwhile, when one sub-frame includes 3 data groups, and when the data groups included in the parade are assigned, as shown in FIG. 9, 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected and bytes error among one RS code word that is less than the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame. Basically, the method of assigning data groups corresponding to multiple parades is similar to the method of assigning data groups corresponding to a single parade. In other words, data groups included in other parades that are to be assigned to an MH frame are also respectively assigned according to a cycle period of 4 slots. At this point, data groups of a different parade may be sequentially assigned to the respective slots in a circular method. Herein, the data groups are assigned to slots starting from the ones to which data groups of the previous parade have not yet been assigned. For example, when it is assumed that data groups corresponding to a parade are assigned as shown in FIG. 9, data groups corresponding to the next parade may be assigned to a sub-frame starting either from the 12th slot of a sub-frame. However, this is merely exemplary. In another example, the data groups of the next parade may also be sequentially assigned to a different slot within a sub-frame at a cycle period of 4 slots starting from the 3rd slot.

Figure 10:
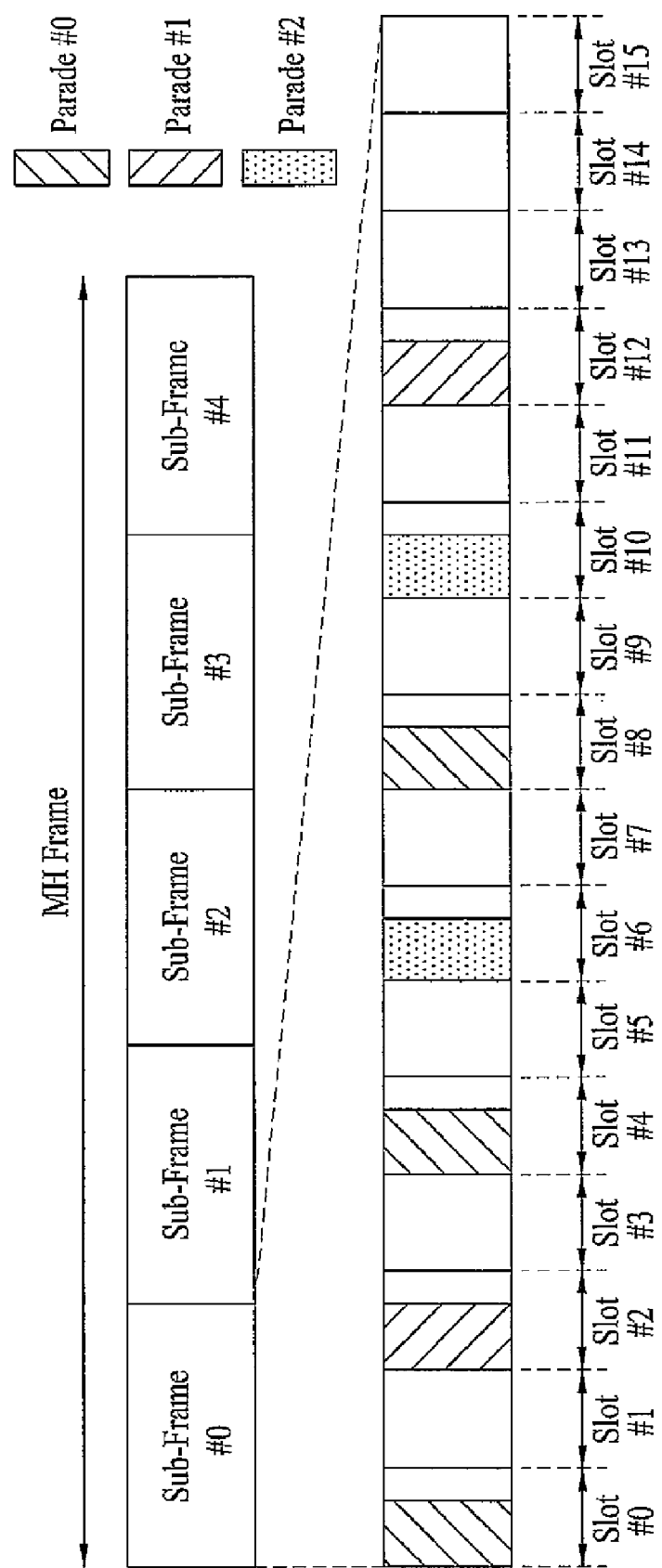
FIG. 10 illustrates an example of 3 parades being assigned to an MH frame according to the present invention.

FIG. 10 illustrates an example of transmitting 3 parades (Parade #0, Parade #1, and Parade #2) viaan MH frame. More specifically, FIG. 10 illustrates an example of transmitting parades included in one of 5 sub-frames, wherein the 5 sub-frames configure one MH frame. When the 1st parade (Parade #0) includes 3 data groups for each sub-frame, the positions of each data groups within the sub-frames may be obtained by substituting values '0' to '2' for i in Equation 1. More specifically, the data groups of the 1st parade (Parade #0) are sequentially assigned to the 1st, 5th, and 9th slots (Slot #0, Slot #4, and Slot #8) within the sub-frame. Also, when the 2nd parade includes 2 data groups for each sub-frame, the positions of each data groups within the sub-frames may be obtained by substituting values '3' and '4' for i in Equation 1. More specifically, the data groups of the 2nd parade (Parade #1) are sequentially assigned to the 2nd and 12th slots (Slot #1 and Slot #11) within the sub-frame. Finally, when the 3rd parade includes 2 data groups for each sub-frame, the positions of each data groups within the sub-frames may be obtained by substituting values '5' and '6' for i in Equation 1. More specifically, the data groups of the 3rd parade (Parade #2) are sequentially assigned to the 7th and 11th slots (Slot #6 and Slot #10) within the sub-frame.

As described above, data groups of multiple parades may be assigned to a single MH frame, and, in each sub-frame, the data groups are serially allocated to a group space having 4 slots from left to right. Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '15' to '40'.

Figure 11:
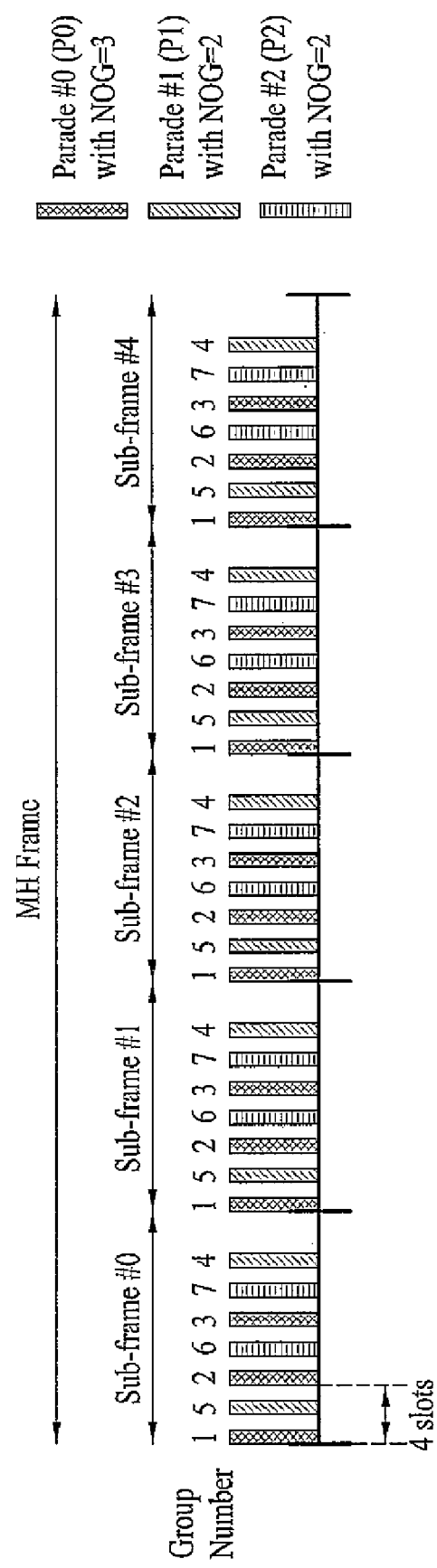
FIG. 11 illustrates an example of the process of assigning 3 parades shown in FIG. 10 being expanded to 5 sub-frames within an MH frame.
Figure 12:
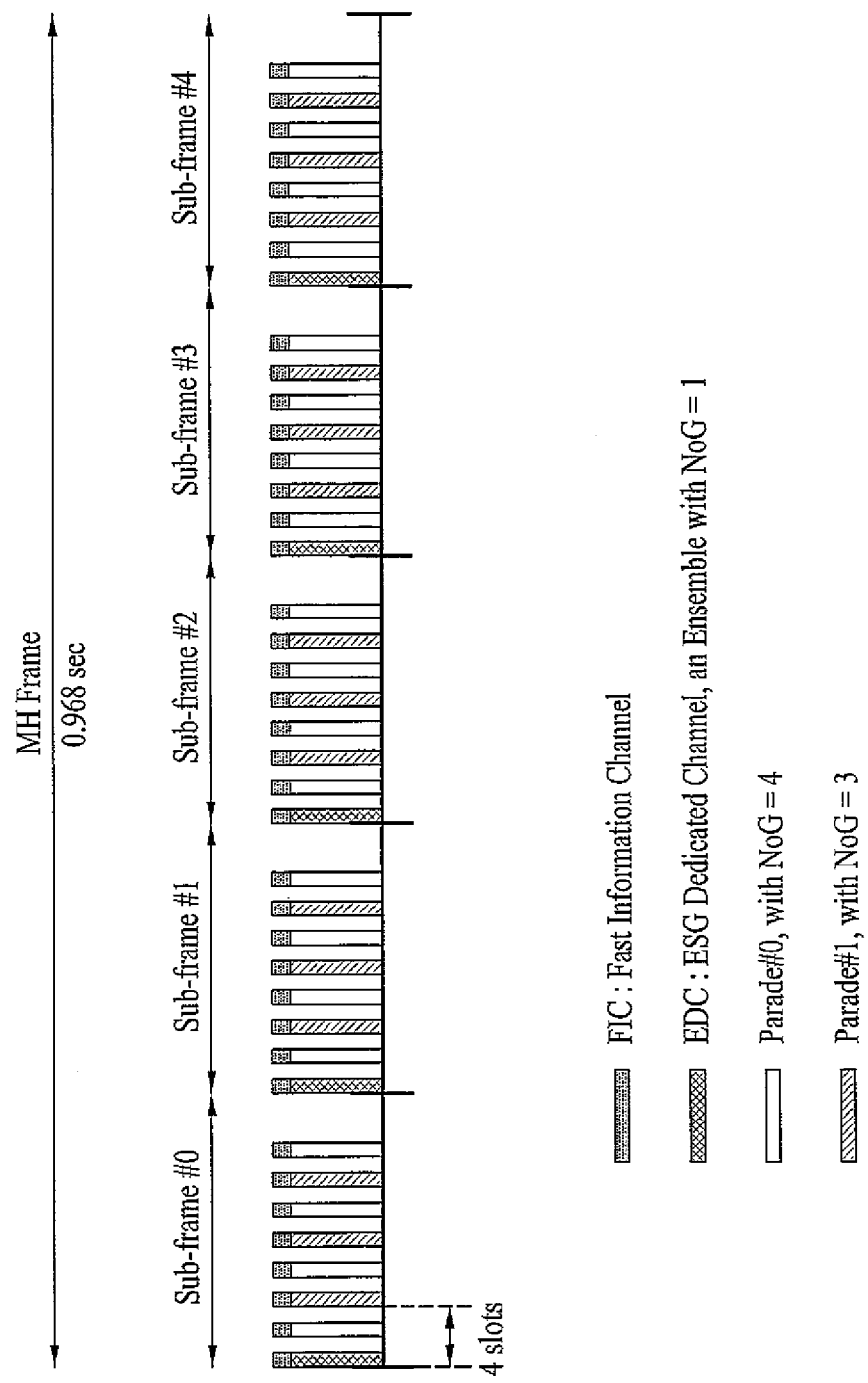
FIG. 12 illustrates a data transmission structure according to an embodiment of the present invention, wherein signaling data are included in a data group so as to be transmitted.

FIG. 11 illustrates an example of expanding the assignment process of 3 parades, shown in FIG. 10, to 5 sub-frames within an MH frame. FIG. 12 illustrates a data transmission structure according to an embodiment of the present invention, wherein signaling data are included in a data group so as to be transmitted. As described above, an MH frame is divided into 5 sub-frames. Data groups corresponding to a plurality of parades co-exist in each sub-frame. Herein, the data groups corresponding to each parade are grouped by MH fram units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each FIC segment is interleaved by MH sub-frame units, thereby configuring an FIC body, which corresponds to a completed FIC transmission structure. However, whenever required, each FIC segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames. As shown in FIG. 12, the FIC segment corresponding to each data group may describe service information of an MH ensemble to which the corresponding data group belongs. When FIC segments within a sub-frame are grouped and deinterleved, all service information of a physical channel through which the corresponding FICs are transmitted may be obtained. Therefore, the receiving system may be able to acquire the channel information of the corresponding physical channel, after being processed with physical channel tuning, during a sub-frame period. Furthermore, FIG. 12 illustrates a structure further including a separate EDC parade apart from the service parade and wherein electronic service guide (ESG) data are transmitted in the 1st slot of each sub-frame.

Figure 13:
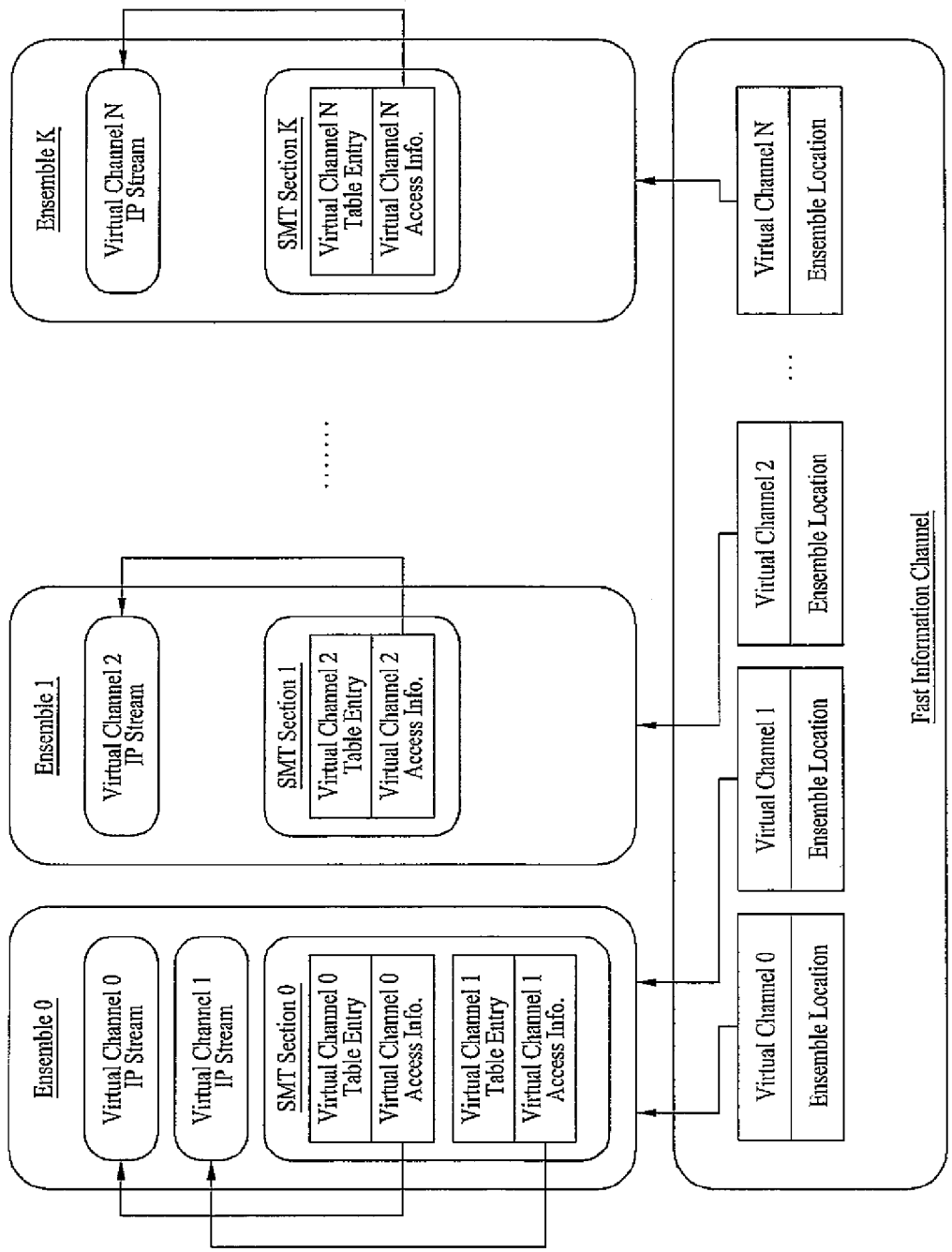
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure. Hereinafter, a detailed description on how the receiving system accesses a virtual channel via FIC and SMT will now be given with reference to FIG. 13. The FIC body defined in an MH transport (M1) identifies the physical location of each the data stream for each virtual channel and provides very high level descriptions of each virtual channel. Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on). The FIC body payload includes information on MH ensembles (e.g., ensemble_id field, and referred to as "ensemble location" in FIG. 13) and information on a virtual channel associated with the corresponding MH ensemble (e.g., major_channel_num field and minor_channel_num field, and referred to as "Virtual Channel 0", "Virtual Channel 1", ..., "Virtual Channel N" in FIG. 13).

The application of the signaling structure in the receiving system will now be described in detail. When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Figure 14:
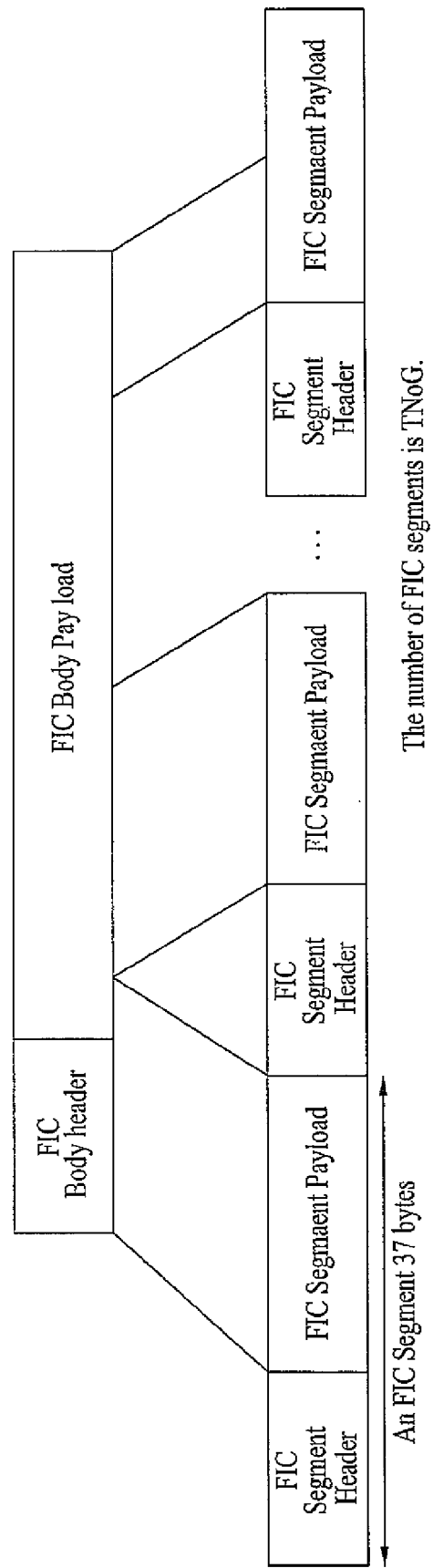
FIG. 14 illustrates an exemplary FIC body format according to an embodiment of the present invention.

The digital broadcast receiving system according to the present invention adopts the fast information channel (FIC) for a faster access to a service that is currently being broadcasted. More specifically, the FIC handler 215 of FIG. 1 parses the FIC body, which corresponds to an FIC transmission structure, and outputs the parsed result to the physical adaptation control signal handler 216. FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload, is segmented in units of 35 bytes, which are then carried in FIC segment payload within at least one of FIC segment, so as to be transmitted. In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes. However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention. Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC. The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data. The FIC_seg_number field is a 4-bit field. Herein, when a single FIC body is divided into a plurality of FIC segments and transmitted, the FIC_seg_number field indicates the number of the corresponding FIC segment. Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'. According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 1-bit field. The current_next indicator field acts as an indicator identifying whether the corresponding FIC data carry MH ensemble configuration information of an MH frame including the current FIC segment, or whether the corresponding FIC data carry MH ensemble configuration information of a next MH frame. The ESG_version field is a 5-bit field indicating ESG version information. Herein, by providing version information on the service guide providing channel of the corresponding ESG, the ESG_version field enables the receiving system to notify whether or not the corresponding ESG has been updated. Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field. More specifically, the ensemble_id field is an 8-bit field indicating identifiers of an MH ensemble through which MH services are transmitted. Herein, the ensemble_id field binds the MH services and the MH ensemble. The SI_version field is a 4-bit field indicating version information of SI data included in the corresponding ensemble, which is being transmitted within the RS frame. Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field. The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on. The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel. The stand_alone_service_indicator field is also a 1-bit field, which indicates whether the service of the corresponding virtual channel corresponds to a stand alone service. The major_channel_num field is an 8-bit field indicating a major channel number of the corresponding virtual channel. Finally, the minor_channel_num field is also an 8-bit field indicating a minor channel number of the corresponding virtual channel.

FIG. 17 illustrates an exemplary bit stream syntax structure of a service map table (hereinafter referred to as "SMT") according to the present invention. According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area. Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290. The following corresponds to example of the fields that may be transmitted through the SMT.

The table_id field corresponds to an 8-bit unsigned integer number, which indicates the type of table section being defined in the service map table (SMT). The ensemble_id field is an 8-bit unsigned integer field, which corresponds to an ID value associated to the corresponding MH ensemble.

Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

The num_channels field is an 8-bit field, which specifies the number of virtual channels in the corresponding SMT section. Meanwhile, the SMT according to the embodiment of the present invention provides information on a plurality of virtual channels using the 'for' loop statement. The major_channel_num field corresponds to an 8-bit field, which represents the major channel number associated with the corresponding virtual channel. Herein, the major_channel_num field may be assigned with a value ranging from '0x00' to '0xFF'. The minor_channel_num field corresponds to an 8-bit field, which represents the minor channel number associated with the corresponding virtual channel. Herein, the minor_channel_num field may be assigned with a value ranging from '0x00' to '0xFF'.

The short_channel_name field indicates the short name of the virtual channel. The service_id field is a 16-bit unsigned integer number (or value), which identifies the virtual channel service. The service_type field is a 6-bit enumerated type field, which identifies the type of service carried in the corresponding virtual channel as defined in Table 2 below.

TABLE 2

| | |
|---|---|
| 0x00 | [Reserved] |
| 0x01 | MH_digital_television - The virtual channel carries television programming (audio, video and optional associated data) conforming to ATSC standards. |
| 0x02 | MH_audio - The virtual channel carries audio programming (audio service and optional associated data) conforming to ATSC standards. |
| 0x03 | MH_data_only_service - The virtual channel carries a data service conforming to ATSC standards, but no video or audio component. |
| 0x04-0xFF | [Reserved for future ATSC use] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden. The num_components field is a 5-bit field, which specifies the number of IP stream components in the corresponding virtual channel. The IP_version_flag field corresponds to a 1-bit indicator. More specifically, when the value of the IP_version_flag field is set to '1', this indicates that a source_IP address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4 addresses.

The source_IP_address_flag field is a 1-bit Boolean flag, which indicates, when set, that a source IP address of the corresponding virtual channel exist for a specific multicast source. The virtual_channel_target_IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components. Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated). Table 3 below shows an example of an RTP payload type.

TABLE 3

| RTP_payload_type | Meaning |
|---|---|
| 35 | AVC video |
| 36 | MH audio |
| 37-72 | [Reserved for future ATSC use] |

The component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target IP address to access the corresponding IP stream component. Accordingly, the receiving system (or receiver) will ignore the virtual_channel_target_IP_address field included in the num_channels loop. The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream. The component_level_descriptor( ) represents zero or more descriptors providing additional information on the corresponding IP stream component. The virtual_channel_level_descriptor( ) represents zero or more descriptors providing additional information for the corresponding virtual channel. The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ) . The descriptor_length field is also an 8-bit unsigned integer, which indicates the length (in bytes) of the portion immediately following the descriptor_length field up to the end of the MH_audio_descriptor( ) . The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B. The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '1', the bit rate corresponds to an upper limit as defined in Table A3.4 of ATSC A/53B. The ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention. The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT. The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP. The fields included in the MH_RTP_payload_type_descriptor( ) will now be described in detail.

The descriptor_tag field corresponds to an 8-bit unsigned integer having the value TBD, which identifies the current descriptor as the MH_RTP_payload_type_descriptor( ). The descriptor_length field also corresponds to an 8-bit unsigned integer, which indicates the length (in bytes) of the portion immediately following the descriptor_length field up to the end of the MH_RTP_payload_type_descriptor ( ). The RTP_payload_type field corresponds to a 7-bit field, which identifies the encoding format of the IP stream component. Herein, the dynamic value of the RTP_payload_type field is in the range of '96' to '127'. The MIME_type_length field specifies the length (in bytes) of the MIME_type field. The MIME_type field indicates the MIME type corresponding to the encoding format of the IP stream component, which is described by the MH_RTP_payload_type_descriptor( ).

FIG. 20 illustrates an exemplary bit stream syntax structure of an MH current event descriptor according to the present invention. The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel. The fields included in the MH_current_event_descriptor( ) will now be described in detail.

The descriptor_tag field corresponds to an 8-bit unsigned integer having the value TBD, which identifies the current descriptor as the MH_current_event_descriptor( ) . The descriptor_length field also corresponds to an 8-bit unsigned integer, which indicates the length (in bytes) of the portion immediately following the descriptor_length field up to the end of the MH_current_event_descriptor( ) . The current_event_start_time field corresponds to a 32-bit unsigned integer quantity. The current_event_start_time field represents the start time of the current event and, more specifically, as the number of GPS seconds since 00:00:00 UTC, Jan. 6, 1980. The current_event_duration field corresponds to a 24-bit field. Herein, the current_event_duration field indicates the duration of the current event in hours, minutes, and seconds (for example, wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 21 illustrates an exemplary bit stream syntax structure of an MH next event descriptor according to the present invention. The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( ) . The descriptor_length field also corresponds to an 8-bit unsigned integer, which indicates the length (in bytes) of the portion immediately following the descriptor_length field up to the end of the MH_next_event_descriptor( ) . The next_event_start_time field corresponds to a 32-bit unsigned integer quantity. The next_event_start_time field represents the start time of the next event and, more specifically, as the number of GPS seconds since 00:00:00 UTC, Jan. 6, 1980. The next_event_duration field corresponds to a 24-bit field. Herein, the next_event_duration field indicates the duration of the next event in hours, minutes, and seconds (for example, wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 22 illustrates an exemplary bit stream syntax structure of an MH system time descriptor according to the present invention. The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characterstics of the MH service data. The fields included in the MH_system_time_descriptor( ) will now be described in detail.

The descriptor_tag field corresponds to an 8-bit unsigned integer having the value TBD, which identifies the current descriptor as the MH_system_time_descriptor( ) . The descriptor_length field also corresponds to an 8-bit unsigned integer, which indicates the length (in bytes) of the portion immediately following the descriptor_length field up to the end of the MH_system_time_descriptor( ). The system_time field corresponds to a 32-bit unsigned integer quantity. The system_time field represents the current system time and, more specifically, as the number of GPS seconds since 00:00:00 UTC, Jan. 6, 1980. The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time. The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
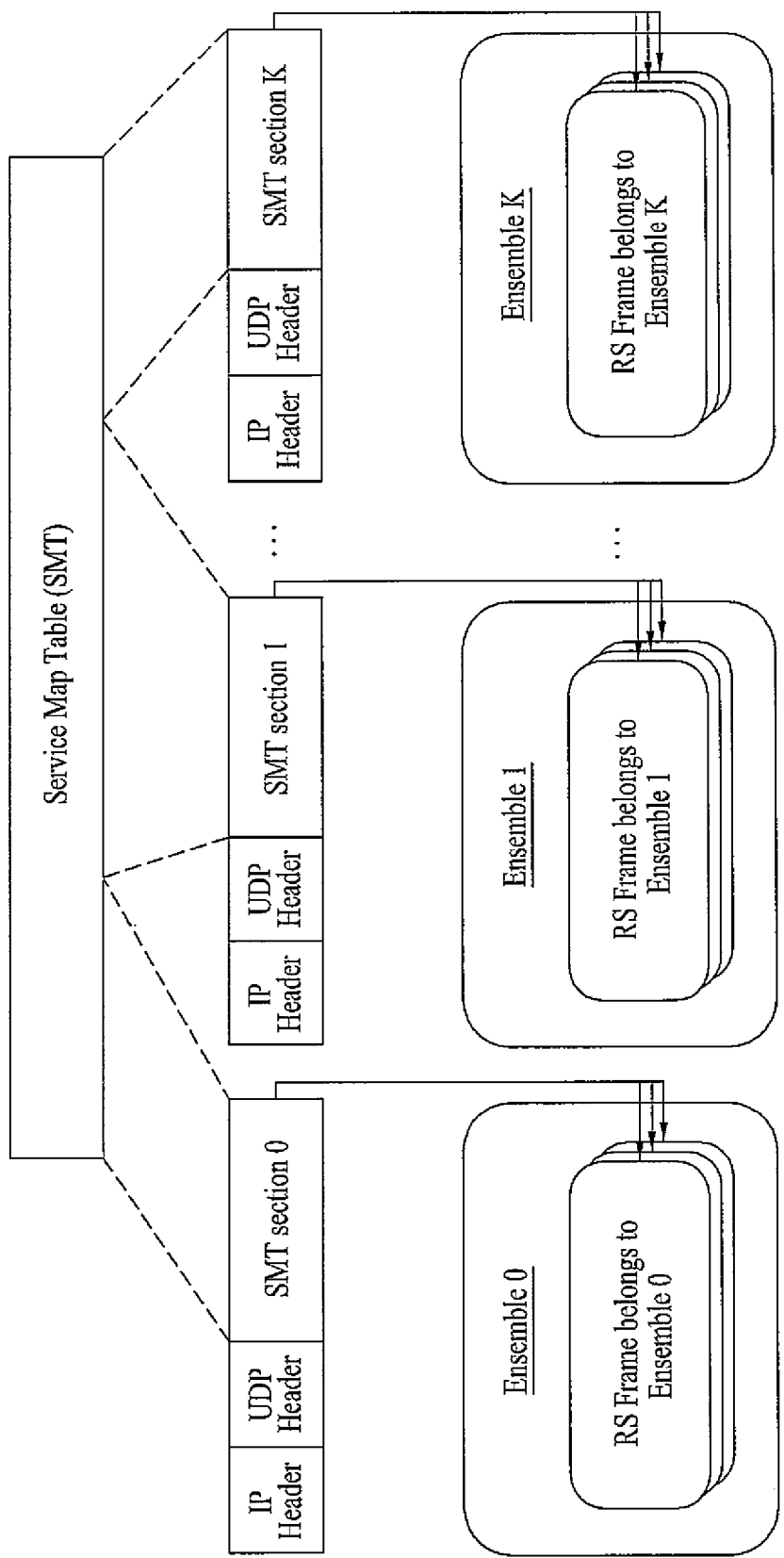
FIG. 23 illustrates segmentation and encapsulation processes of a service map table according to the present invention.

FIG. 23 illustrates segmentation and encapsulation processes of a service map table (SMT) according to the present invention. According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
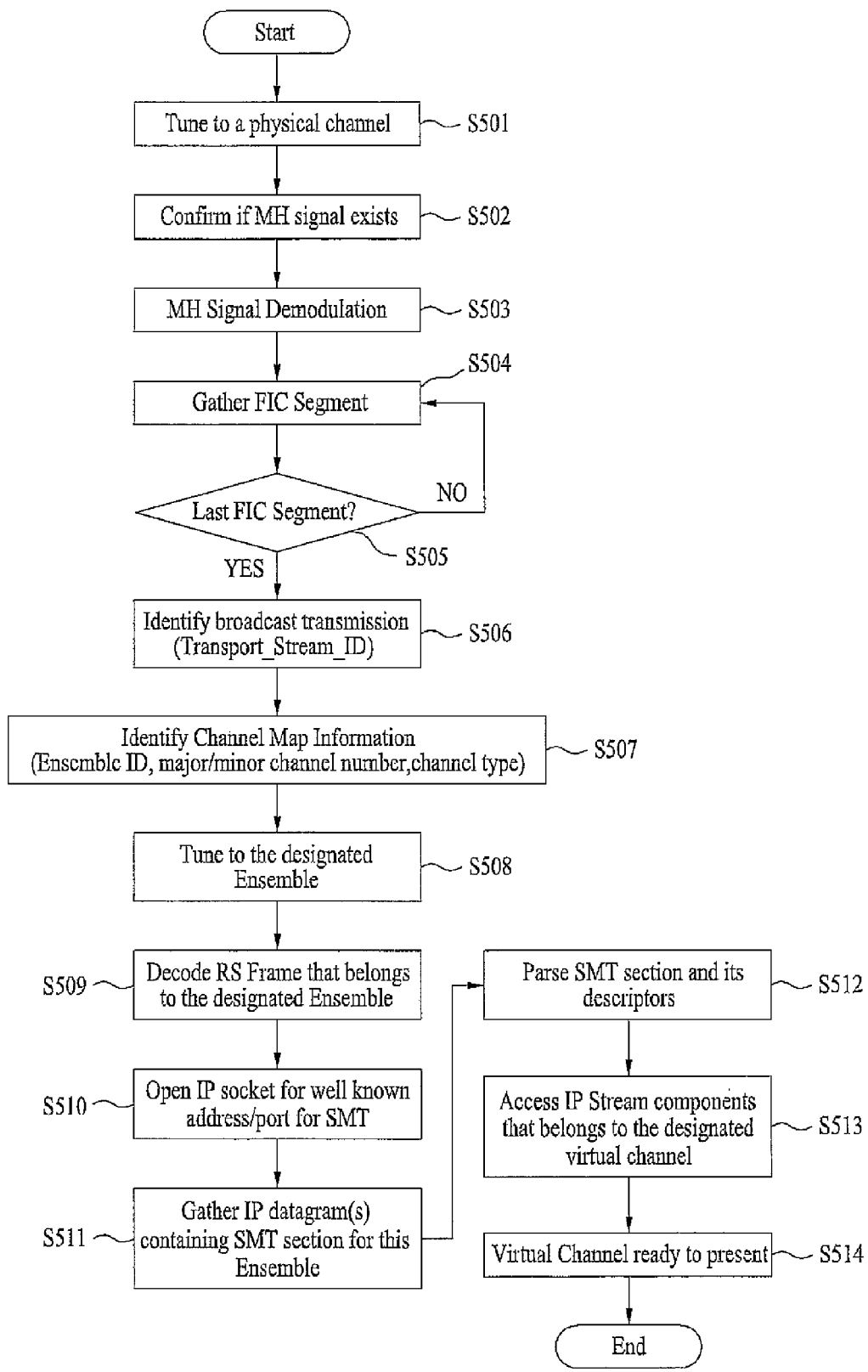
FIG. 24 illustrates a flow chart for accessing a virtual channel using FIC and SMT according to the present invention.

FIG. 24 illustrates a flow chart for accessing a virtual channel using FIC and SMT according to the present invention. More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505). According to the embodiment of the present invention, an FIC segment is inserted in a data group, so as to be transmitted. More specifically, the FIC segment corresponding to each data group described service information on the MH ensemble to which the corresponding data group belongs.

When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments. Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510). According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section. Furthermore each SMT provides IP access information on each virtual channel subordinate to the corresponding MH ensemble including each SMT. Finally, the SMT provides IP stream component level information required for the servicing of the corresponding virtual channel. Therefore, by using the information parsed from the SMT, the IP stream component belonging to the virtual channel requested for reception may be accessed (S513). Accordingly, the service associated with the corresponding virtual channel is provided to the user (S514).

Hereinafter, a digital broadcast receiving system according to an embodiment of the present invention will be described in detail, based upon the description of the present invention with reference to FIG. 1 to FIG. 24. Therefore, the description of FIG. 1 to FIG. 24 may be partially or entirely applied to the digital broadcast receiving system according to the embodiment of the present invention. Evidently, the scope of the appended claims and their equivalents will not depart from the description of the present invention.

Figure 25:
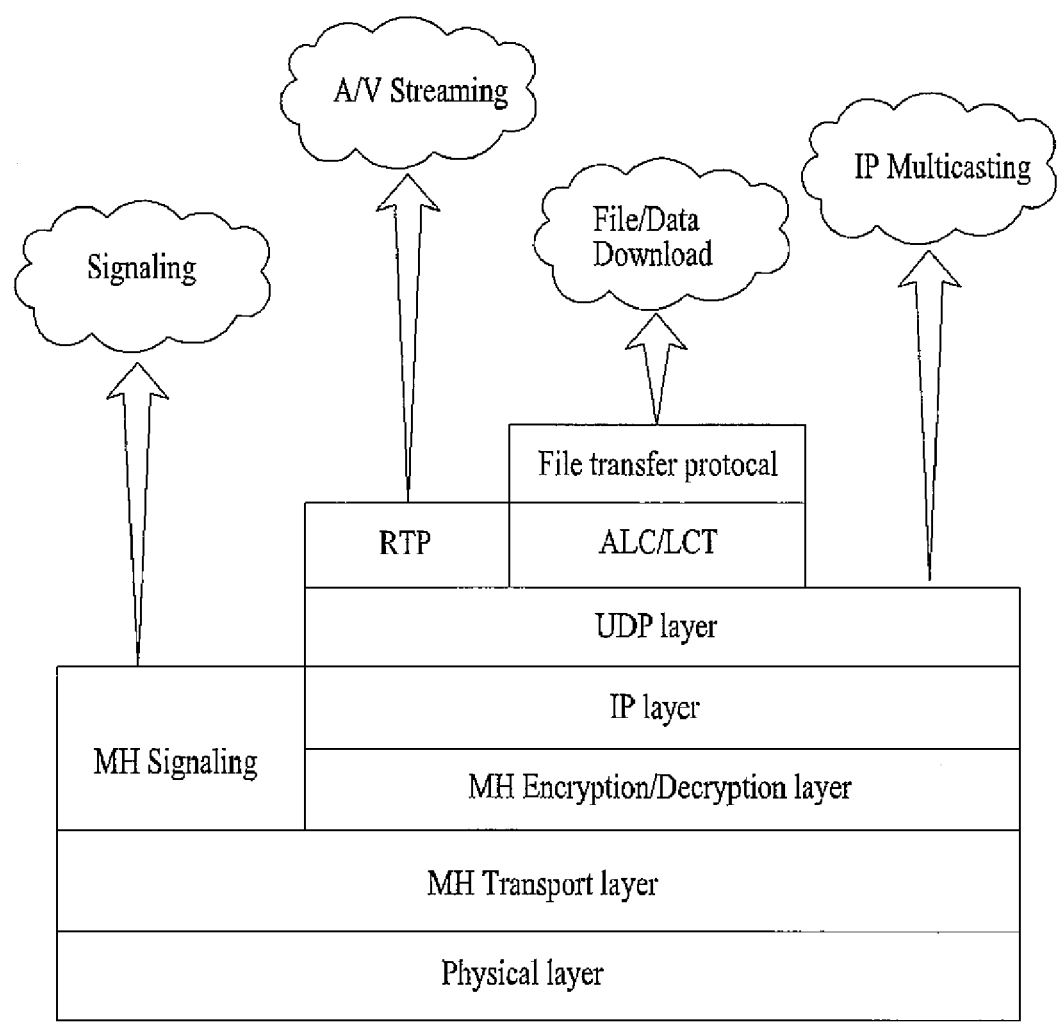
FIG. 25 is a view showing a protocol stack of an MH system according to one embodiment of the present invention.

FIG. 25 shows a protocol stack of an MH system according to one embodiment of the present invention. Hereinafter, with reference to FIG. 25, a brief description will be given of the protocol stack of the MH system according to one embodiment of the present invention.

According to one embodiment of the present invention, a definition is given of signaling data for execution of encryption and decryption of an RS frame corresponding to an MH ensemble before the RS frame is transmitted through an MH transport layer and MH physical layer. In particular, a method of using, for example, FIC signaling data as the signaling data may be adopted. On the other hand, the structure of the RS frame will be understood from the description of FIG. 3.

The term "conditional access" is used throughout this specification. The "conditional access" corresponds to a state in which mobile service data was encrypted (for example, scrambled) so that it can be used by only a specific user or specific digital broadcast receiver. For example, the "conditional access" may correspond to a case where a conditional access function was set by a conditional access system (CAS) or a control access system (CAS).

Also, the term "control data" is used throughout this specification. The "control data" corresponds to data required to remove the conditional access function of data to which the conditional access is applied. The "control data" may be named a "key value" and may be composed of, for example, an entitlement management message (EMM), entitlement control message (ECM), or the like. Further, the ECM may include a control word (CW).

Figure 26:
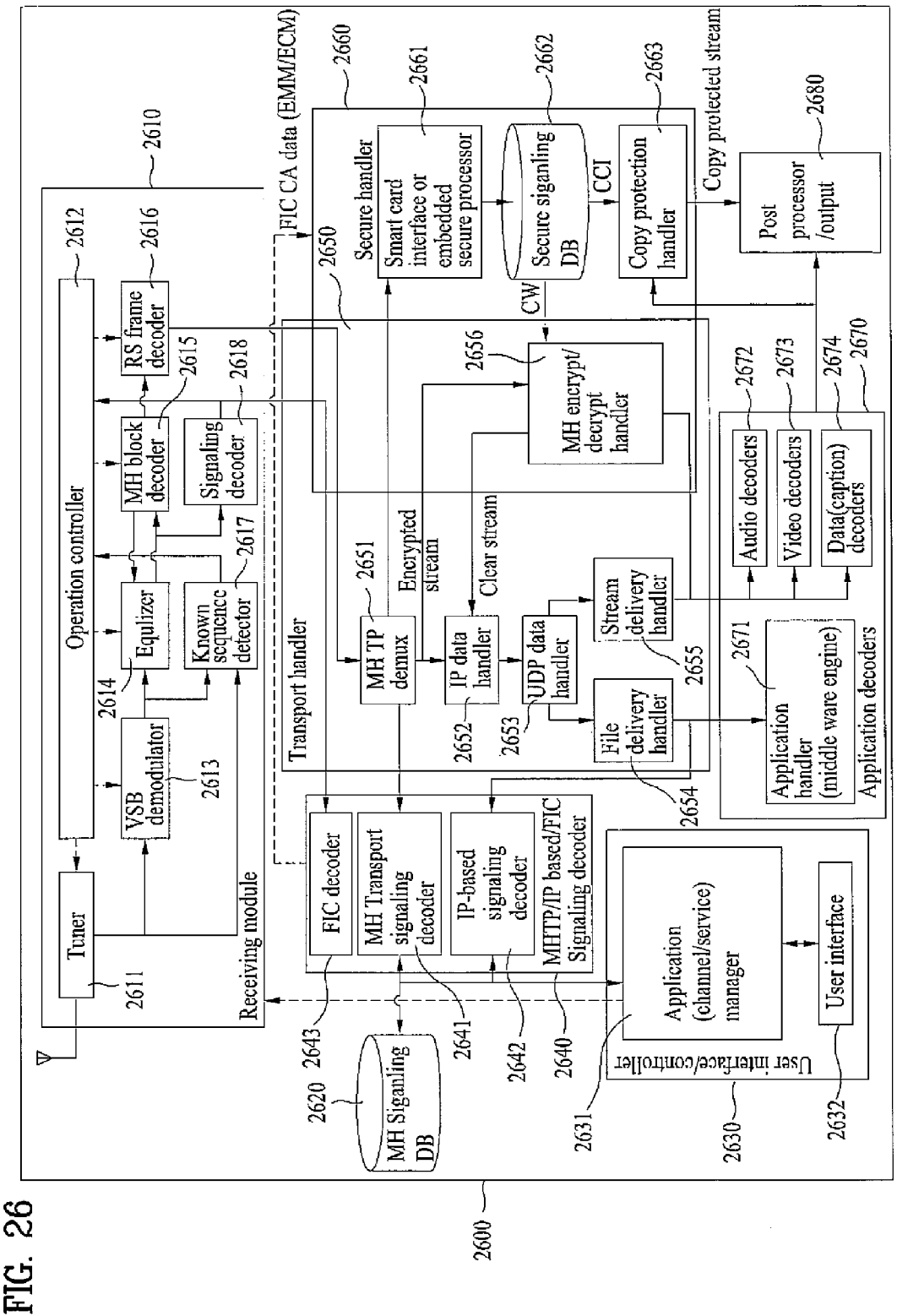
FIG. 26 is a block diagram showing the configuration of a digital broadcast receiver according to one embodiment of the present invention.

FIG. 26 is a block diagram showing the configuration of a digital broadcast receiver according to one embodiment of the present invention. Hereinafter, a function of the digital broadcast receiver according to one embodiment of the present invention processing conditional access-applied mobile service data will be described with reference to FIG. 26. For reference, the digital broadcast receivers of FIGS. 1 and 26 are similar in that they process a mobile digital broadcast, but the digital broadcast receiver of FIG. 26 is particularly characterized by that it can also process conditional access-applied mobile service data. Also, those skilled in the art will readily appreciate the operation of the digital broadcast receiver of FIG. 26 by referring to the entire description of this specification. Further, the scope of the present invention is not limited to contents described in the drawings and should be in principle interpreted based on contents described in the appended claims.

As shown in FIG. 26, the digital broadcast receiver according to one embodiment of the present invention, denoted by reference numeral 2600, includes a receiving module 2610, MH signaling DB 2620, user interface/controller 2630, MH TP/IP-based/FIC signaling decoder 2640, transport handler 2650, secure handler 2660, application decoder 2670, post processor/output module 2680, and so forth. For reference, in FIG. 26, a dotted line indicates the flow of data controlling each module, and a solid line indicates the flow of actual data being transmitted.

The receiving module 2610 includes a tuner 2611, operation controller 2612, VSB demodulator 2613, equalizer 2614, MH block decoder 2615, RS frame decoder 2616, known sequence detector 2617, and signaling decoder 2618.

The user interface/controller 2630 includes an application manager 2631 and a user interface 2632. The MH TP/IP-based/FIC signaling decoder 2640 includes an MH transport signaling decoder 2641, IP-based signaling decoder 2642, and FIC decoder 2643.

The transport handler 2650 includes an MH TP demux 2651, IP data handler 2652, UDP data handler 2653, file delivery handler 2654, stream delivery handler 2655, and MH encrypt/decrypt handler 2656.

The secure handler 2660 includes a smart card interface 2661, secure signaling DB 2662, copy protection handler 2663, and MH encrypt/decrypt handler 2656. For reference, an embedded secure processor may be used instead of the smart card interface 2661.

The application decoder 2670 includes an application handler 2671, audio decoder 2672, video decoder 2673, and data decoder 2674.

The tuner 2611 of the digital broadcast receiver 2600 according to one embodiment of the present invention receives a broadcast signal into which mobile service data and main service data are multiplexed. Of course, a module taking charge of this function may be named a reception unit.

The FIC decoder 2643 extracts transmission parameter channel (TPC) signaling information and fast information channel (FIC) signaling information from a data group in the received mobile service data. Of course, a module taking charge of this function may be named an extractor.

The transport handler 2650 and/or secure handler 2660 acquires control data required to decrypt a service included in an ensemble, which is a virtual channel group of the received mobile service data, using the extracted FIC signaling information. Of course, a module taking charge of this function may be named an acquirer. For reference, it may be assumed that the service is in its encrypted state.

Also, the transport handler 2650 and/or secure handler 2660 controls such that the encrypted service is decrypted, using the acquired control data. Of course, a module taking charge of this function may be named a controller.

On the other hand, the FIC signaling information implemented according to one embodiment of the present invention may be configured as in FIGS. 27 and 28, which will be described later.

Therefore, according to one embodiment of the present invention, in an MH digital broadcasting environment, only a broadcast receiver authorized to use a conditional access-applied service (for example, an encrypted service, scrambled service, or the like) can use that service. Also, according to one embodiment of the present invention, a method of using FIC signaling information is newly defined as a definite signaling method for implementation of such a technology.

On the other hand, the above-stated data group may include, for example, a plurality of known data sequences, and the TPC signaling information and the FIC signaling information may be designed to be placed, for example, between a first known data sequence and a second known data sequence, among the known data sequences.

Therefore, a known data detector of the digital broadcast receiver according to one embodiment of the present invention may detect known data in the received broadcast signal, and an equalizer of the digital broadcast receiver according to this embodiment may channel-equalize mobile service data corresponding to the detected known data using the detected known data. For reference, the functions of the known data detector and equalizer were adequately described in the description of FIG. 1.

Moreover, according to this embodiment, the equalizer can improve equalization performance by using a known data symbol sequence inputted from the known data detector.

Hereinafter, the operation of the broadcast receiver capable of processing the conditional access-applied service will be described in more detail with reference to FIG. 26.

The MH signaling DB 2620 is a database that stores MH signaling data received in non-IP or IP form and provides the stored data as needed.

The MH transport signaling decoder 2641 processes non-IP MH signaling information among MH signaling information, and the IP-based signaling decoder 2642 processes IP-based MH signaling information among the MH signaling information.

The MH TP demux 2651 processes an MH transport packet (TP) extracted from an RS frame, which is an output of the RS frame decoder 2616, and the IP data handler 2652 processes an IP datagram to be delivered to an IP layer, in the MH TP. The UDP data handler 2653 processes a UDP datagram to be delivered to a UDP layer, in the IP datagram.

The file delivery handler 2654 processes a file to be delivered to a file transfer protocol layer, in the UDP datagram. The stream delivery handler 2655 processes data to be delivered to an RTP layer (for example, a stream layer for real-time services), in the UDP datagram.

The application manager 2631 manages display of a service guide, and user input signals related to channel setup, etc. through the service guide. The application decoder 2670 manages middle ware and decoders for output of services in an MH broadcasting system. The post processor/output module 2680 is an interface that post-processes decoded services and outputs various data to an external device.

In particular, modules taking charge of main functions in connection with the present invention are the MH encrypt/decrypt handler 2656, smart card interface 2661, secure signaling DB 2662, etc., the functions of which will hereinafter be described in more detail.

The MH encrypt/decrypt handler 2656 controls such that services to which a conditional access is applied, among MH services, are encrypted and decrypted correspondingly to the levels of respective layers.

The secure signaling DB 2662 is a database that stores data required to encrypt or decrypt the conditional access-applied services, or high value services, among the MH services, and data required to securely process the corresponding services, and provides the stored data as needed.

The smart card interface 2661 signifies a processor for processing data needed to be securely processed, and may be replaced by an embedded secure processor.

On the other hand, in order to implement a conditional access function, there is a need for various additional information such as information related to device and user authentication, information about a reception authority level of the user, and a control word (may be referred to as, for example, a "key") which is used for encryption and decryption.

In other words, the control data is composed of an entitlement management message (EMM), entitlement control message (ECM), or the like, and the ECM includes a control word. This control data may be transmitted in an electronic service guide (ESG) or may be transmitted in other ways.

The digital broadcast receiver 2600 receiving the control data stores the control data in the MH signaling DB 2620 or the secure signaling DB 2662, which is a separate secure storage space. In some cases, the digital broadcast receiver 2600 may receive and use the control data in real time.

Accordingly, in the case where an authorized digital broadcast receiver intends to use a conditional access-applied service, it may extract control data corresponding to the service from the MH signaling DB 2620 or secure signaling DB 2662 or may extract the control data corresponding to the service in real time.

Also, the extracted control data is delivered to the MH encrypt/decrypt handler 2656, which then removes the conditional access function of the corresponding service using the delivered control data.

Hereinafter, a detailed description will be given of concrete data or signaling method required to process a conditional access-applied service in an MH digital broadcasting environment. Notably, an FIC may be used for the concrete data or signaling method.

A fast information channel (FIC) according to one embodiment of the present invention acts to transmit signaling information required for a digital broadcast receiver to access a specific service in an MH system.

FIG. 27 shows a data structure of an FIC segment according to one embodiment of the present invention. For reference, the data structure of the FIC segment shown in FIG. 27 is configured differently from the FIC segment data structure shown in FIGS. 15 and 16 to additionally implement a conditional access function. Also, in the data structure shown in FIG. 27, a field area from an 'FIC_TYPE' field to a 'TRANSPORT_STREAM ID' field may be referred to as an FIC segment header.

Each field will hereinafter be described in more detail with reference to FIG. 27.

The 'FIC_TYPE' field indicates information identifying the type of an FIC segment. For example, when the 'FIC_TYPE' field has a value "00", it indicates that this FIC segment represents information between an MH ensemble and MH service of a corresponding physical channel. Also, when the 'FIC_TYPE' field has a value "01", it indicates that this FIC segment represents information associated with the conditional access. Also, when the 'FIC_TYPE' field has a value "10" to "11", it indicates that it is a reserved field.

Meanwhile, a 'CA_ID' field identifies at least one control data. The control data may be, for example, an ECM or EMM.

An 'ERROR_INDICATOR' field indicates whether at least one error bit is present in this FIC segment. For example, when the 'ERROR_INDICATOR' field has a value "1", it may indicate that at least one error bit is present in this FIC segment.

An 'FIC_SEG_NUMBER' field indicates the number of the current FIC segment. For example, the number of the first segment may be "0000", and, whenever a segment is added, the number of the added segment may be incremented by one.

An 'FIC_LAST_SEG_NUMBER' field indicates the number of the last FIC segment.

A 'CURRENT_NEXT_INDICATOR' field indicates whether signaling data being transmitted is currently available. For example, the 'CURRENT_NEXT_INDICATOR' field indicates that the signaling data being transmitted is currently available when the value thereof is "1", and that the signaling data being transmitted is not available yet when the value thereof is "0".

A 'VERSION_NUMBER' field is increased in value from 1 up to 32 when there is a change in information being carried in data.

The 'TRANSPORT_STREAM ID' field signifies a unique identifier of a broadcast stream in which this FIC segment is carried.

On the other hand, a 'data_byte' field corresponds to control data carried over this FIC segment. For detailed example, an ECM or EMM may be defined on the 'data_byte' field.

FIG. 28 shows a payload in a data structure of an FIC segment according to one embodiment of the present invention. For reference, the payload in the data structure of the FIC segment shown in FIG. 28 is configured differently from the payload in the FIC segment data structure shown in FIGS. 15 and 16 to additionally implement a conditional access function.

Each field will hereinafter be described in more detail with reference to FIG. 28. Here, a description of the same fields as those of the FIC segment shown in FIGS. 15 and 16 will be omitted.

An 'SI_VERSION' field indicates information identifying the version of system information (SI).

A 'CA_INDICATOR' field indicates whether this FIC segment carries control data associated with the conditional access.

An 'EMM_CA_ID' field signifies a field identifying an entitlement management message (EMM). A digital broadcast receiver according to one embodiment of the present invention can determine using the 'EMM_CA_ID' field whether the control data carried over this FIC segment is the EMM.

An 'ECM_CA_ID' field signifies a field identifying an entitlement control message (ECM). A digital broadcast receiver according to one embodiment of the present invention can determine using the 'ECM_CA_ID' field whether the control data carried over this FIC segment is the ECM.

In other words, a digital broadcast receiver according to one embodiment of the present invention checks the value of a field (the 'EMM_CA_ID' field or 'ECM_CA_ID' field in FIG. 28) identifying first control data defined in the payload of an FIC segment, among the FIC signaling information. Also, the digital broadcast receiver determines whether the value of a field (the 'CA_ID' field in FIG. 27) identifying at least one control data defined in the header of the FIC segment is the same as the value of the field (the 'EMM_CA_ID' field or 'ECM_CA_ID' field in FIG. 28) identifying the first control data defined in the payload of the FIC segment. Also, the digital broadcast receiver, upon determining that the values are the same, can recognize the control data included in the FIC segment as EMM data or ECM data. As a result, the digital broadcast receiver can acquire the EMM data or ECM data.

Therefore, according to one embodiment of the present invention, a change to a channel corresponding to an encrypted service can also be rapidly made by definitely defining a control data signaling method using an FIC.

Hereinafter, a description will be given of a method of transmitting control data and a method of extracting the control data from among various signaling information, according to another embodiment.

Figure 29:
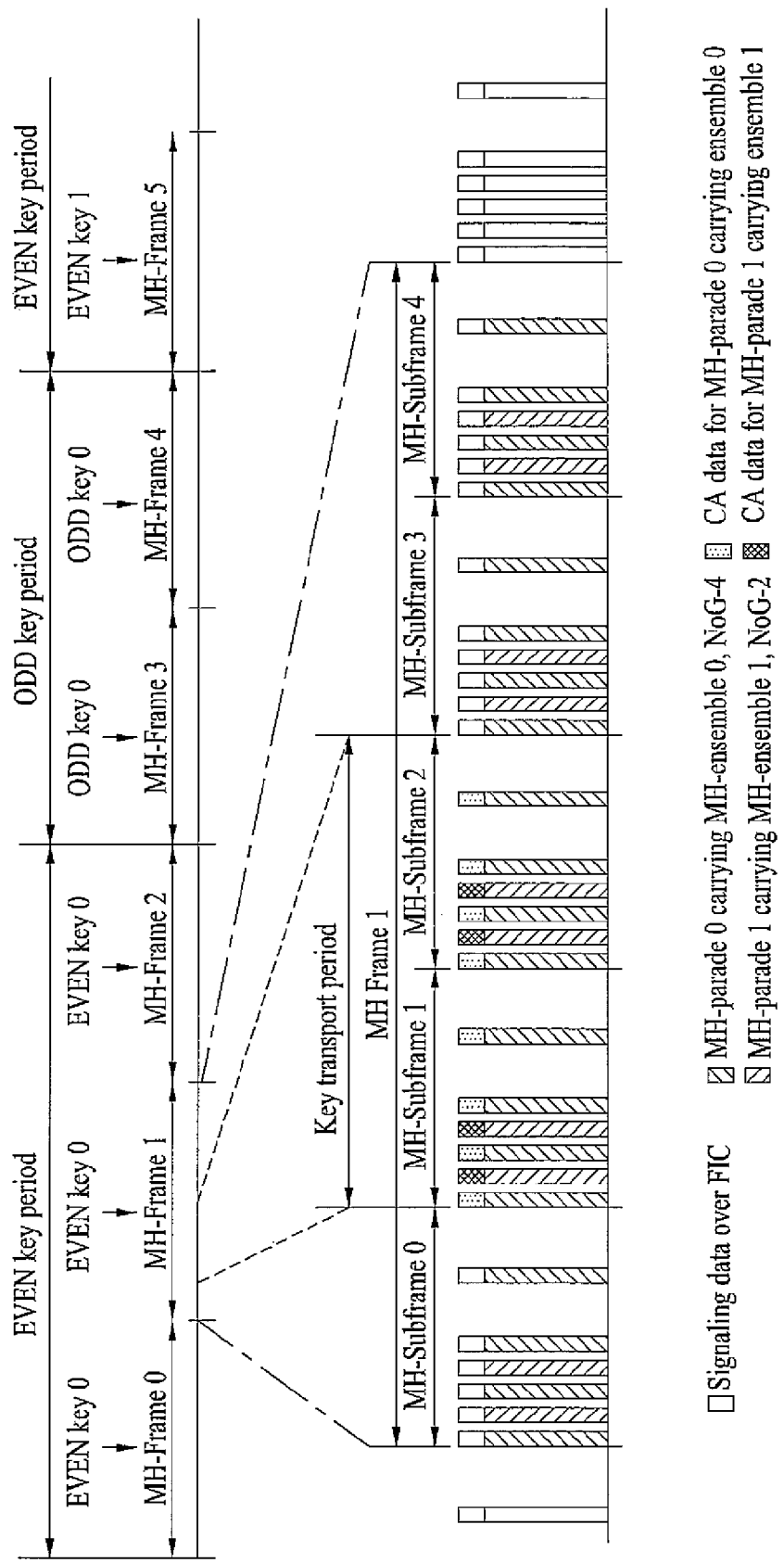
FIG. 29 is a view illustrating a control data transmission process according to one embodiment of the present invention.

FIG. 29 illustrates a control data transmission process according to one embodiment of the present invention. The control data transmission process according to one embodiment of the present invention will hereinafter be described with reference to FIG. 29. For the convenience of description, the control data may be replaced by the term "conditional access (CA) information" or "conditional access (CA) data".

In FIG. 29, a key period represents a period of one MH frame in which the same control data (may be replaced by the term "key" and is particularly illustrated as a key in the drawing) is carried, and a key transport period represents a period of at least one MH subframe in which the control data is carried, among MH subframes belonging to the one MH frame.

As illustrated in FIG. 29, control data for one RS frame is carried in MH-Subframe 1 and MH-Subframe 2 in one MH frame. A key transport period corresponding to MH subframes in one MH frame for carrying the control data may be adjusted according to the size of the control data.

On the other hand, for the key transport period, control data for a parade corresponding to each ensemble ID may be carried over only an FIC obtained through time slicing. That is, as shown in FIG. 29, a design is made such that each parade carrying an ensemble and control data corresponding to the parade are carried over the same time slot. Also, within the key transport period, the control data over the FIC is carried in consideration of the time slicing.

With the design made in this manner, a conditional access-applied MH service is displayed through a time slicing process, resulting in no need to always maintain power on for an MH subframe to extract FIC signaling data. That is, power is enough as long as it is maintained on for only a time slot over which a corresponding parade is carried. As a result, a power saving effect is obtained.

On the other hand, an even key period and an odd key period, which are periods to which the same control data (may be expressed by the term "key" as stated above) is applied, can be appropriately adjusted by a conditional access system (CAS) or the like. However, in the same even key period and odd key period, control data must be at least once carried in respective corresponding MH frames and the control data being carried must have the same value. In this case, an access to a conditional access-applied service can be rapidly made upon a channel change or turning-on of a digital broadcast receiver.

Also, the change between the even key period and the odd key period can be confirmed from the 'VERSION_NUMBER' field shown in FIG. 27. That is, if there is a change in the value of the 'VERSION_NUMBER' field, it can be confirmed that a new key period is applied.

Figure 31:
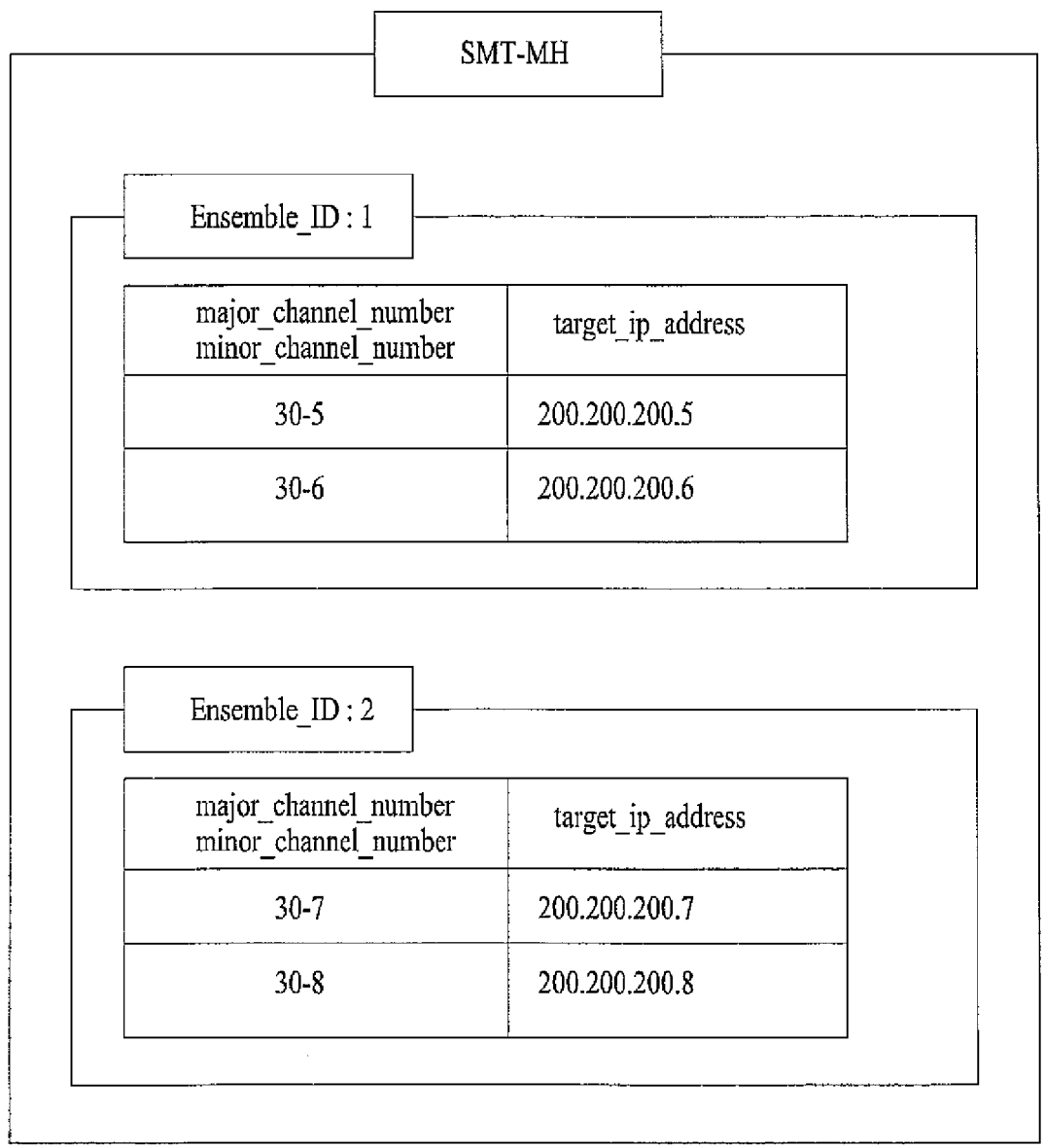
FIG. 31 is a detailed view of an SMT according to one embodiment of the present invention.
Figure 32:
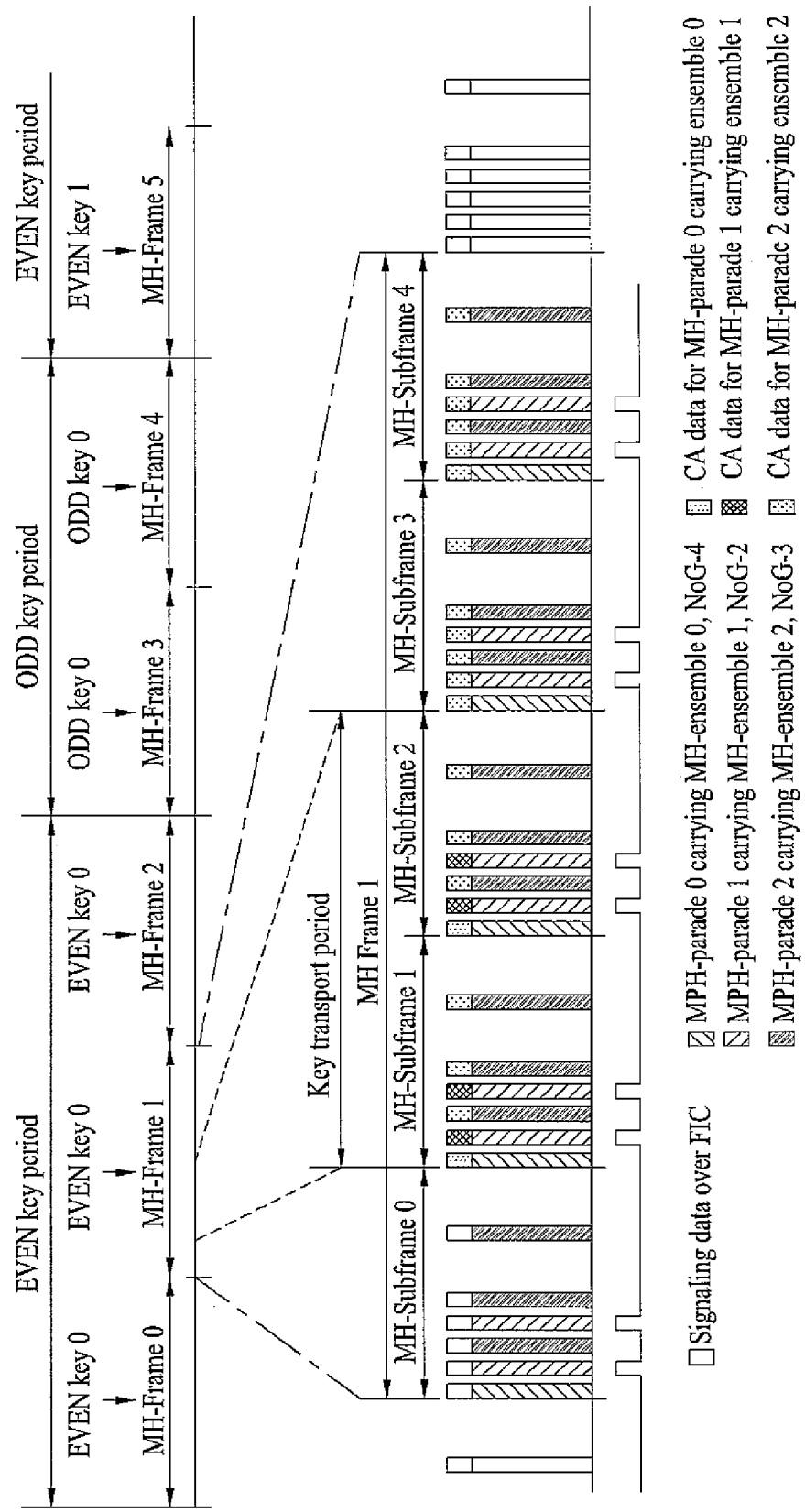
FIG. 32 is a view illustrating a time slicing process when ENSEMBLE_ID shown in FIGS. 30 and 31 is '1' (channel 30-5).

FIG. 30 is a detailed view of FIC signaling information according to one embodiment of the present invention, FIG. 31 is a detailed view of an SMT according to one embodiment of the present invention, FIG. 32 illustrates a time slicing process when ENSEMBLE_ID shown in FIGS. 30 and 31 is '1' (channel 30-5), and FIG. 33 shows an example of control data extracted through the time slicing process of FIG. 32. Hereinafter, with reference to FIGS. 30 to 33, an illustrative description will be given of a process of acquiring control data.

FIGS. 30 and 31 illustrate FIC signaling information including conditional access-applied MH services. As in the FIC signaling information illustrated in FIG. 30, a channel 30-5 and channel 30-6 in which the value of the 'CA_INDI-CATOR' field is set to "1" are conditional access-applied channels. For reference, there may be a service (MH service or the like) corresponding to each channel (virtual channel).

In the case where a digital broadcast receiver intends to perform a channel change to a conditional access-applied channel such as the channel 30-5, it first extracts parades corresponding to an ensemble ID of this channel 30-5 through time slicing, as shown in FIG. 32. At this time, control data transmitted over an FIC is extracted together with a corresponding parade according to the time slicing.

Only control data (control data when the value of the 'CA_ID' field is "0000" and "0101") for a service corresponding to the channel 30-5 is extracted from among FIC signaling information extracted through the time slicing. An example of control data extracted through the time slicing in this manner is shown in FIG. 33.

Therefore, a digital broadcast receiver according to one embodiment of the present invention can discriminate whether the current control data over the FIC is an EMM or ECM, by comparing "CA_ID" field (shown in FIG. 33) with "EMM_CA_ID" field and "ECM_CA_ID" field (shown in FIG. 30). Also, the digital broadcast receiver can decrypt an encrypted MH service using the EMM or ECM.

On the other hand, FIG. 34 shows an RS frame extracted from a parade when an ensemble ID shown in FIG. 32 is 1. As shown in FIG. 34, a scrambled or encrypted area of the RS frame may be an IP payload portion of the RS frame, except an MH TP header and IP header of the RS frame.

For reference, FIGS. 3 and 34 show RS frame structures, in which FIG. 3 shows an example of the structure of an RS frame including no conditional access-applied data and FIG. 34 shows an example of the structure of an RS frame including conditional access-applied data.

Figure 35:
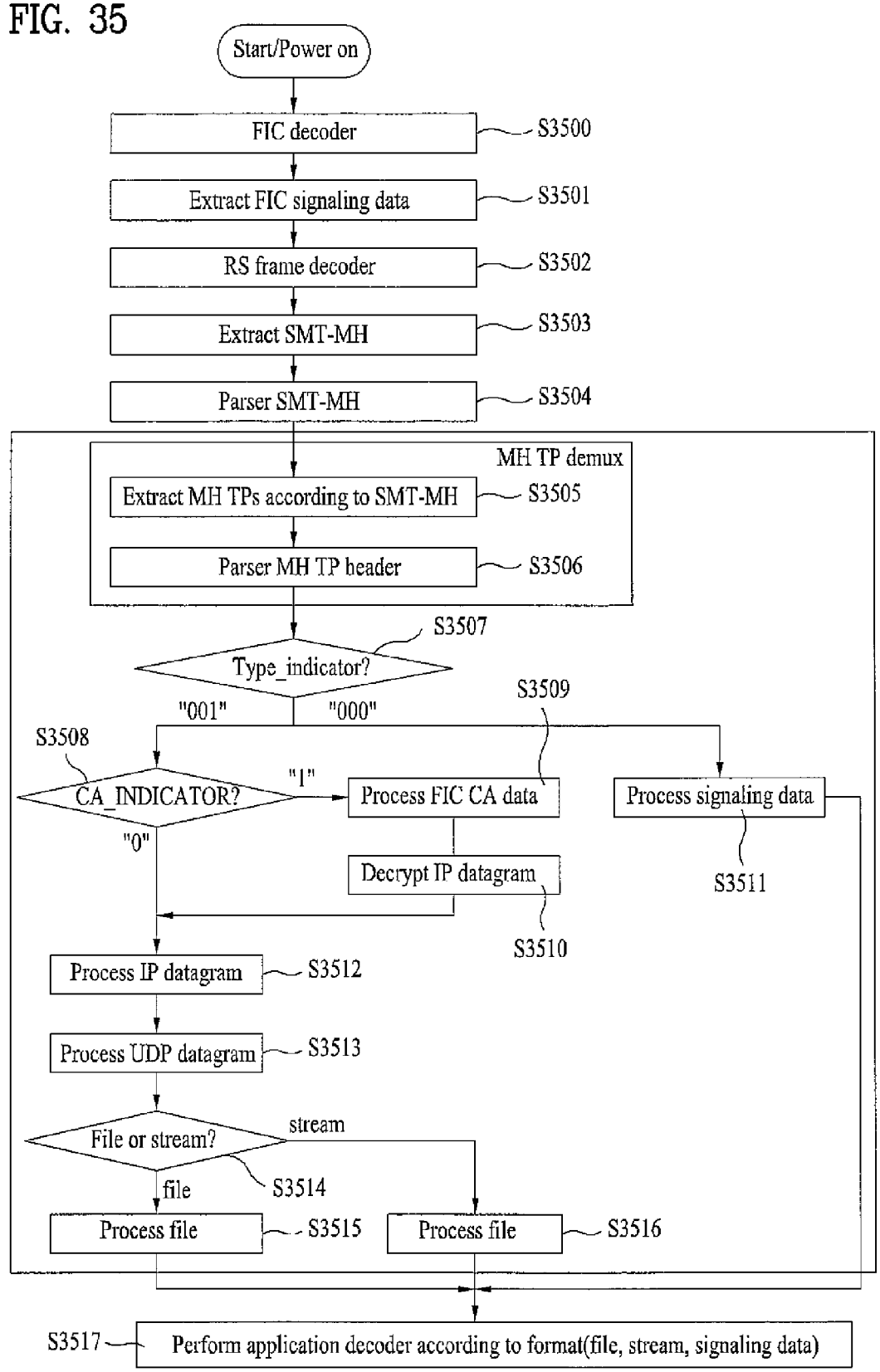
FIG. 35 is a flowchart illustrating a control method of a digital broadcast receiver according to one embodiment of the present invention.

FIG. 35 is a flowchart illustrating a control method of a digital broadcast receiver according to one embodiment of the present invention. With reference to FIG. 35, a brief description will hereinafter be given of the control method of the digital broadcast receiver according to one embodiment of the present invention. For reference, FIGS. 35 and 36 relate to a method invention, which can be interpreted with the description of the above-stated object invention supplementarily applied thereto.

The digital broadcast receiver according to one embodiment of the present invention decodes an FIC (S3500) to extract FIC signaling information therefrom (S3501). The digital broadcast receiver decodes an RS frame (S3502). The digital broadcast receiver extracts an SMT as a result of the decoding (S3503) and parses the extracted SMT (S3504).

The digital broadcast receiver extracts MH TPs according to the SMT (S3505), and parses an MH TP header (S3506) to determine the value of a "Type_Indicator" field (S3507). When it is determined at step S3507 that the field value is '000', the digital broadcast receiver processes signaling data (S3511). When it is determined at step S3507 that the field value is '001', the digital broadcast receiver determines the value of a 'CA_INDICATOR' field of an FIC segment shown in FIG. 28 (S3508).

For reference, the MH TP header includes a "type_indicator" field, etc., and a brief description will hereinafter be given of fields included in a MH TP.

A "type indicator" field indicates the data type of payload data. The "type indicator" field signifies that the MH TP carries signaling data when the value thereof is '000', and that the MH TP carries an IP datagram when the value thereof is '001'.

An "error indicator" field indicates whether there is an error detected in this MH TP, a "stuff indicator" field indicates whether there are stuffing bytes included in this MH TP, a "pointer field" field indicates a start point of a new packet in the payload of this MH TP, and a "stuffing bytes" field may become the start of the payload as needed (when there is stuffing of K bytes in the MH TP).

On the other hand, in the case where it is determined at step S3508 that the value of the 'CA_INDICATOR' field is '1', the digital broadcast receiver processes control data among the FIC signaling information (S3509) and decrypts an IP datagram using the control data (S3510). That is, this case corresponds to a case where an MH service was encrypted at an IP level.

In the case where it is determined at step S3508 that the value of the 'CA_INDICATOR' field is '0', the digital broadcast receiver processes an IP datagram (S3512) and processes a UDP datagram (S3513). Also, the digital broadcast receiver determines whether data transmitted from a digital broadcast transmitter or the like is a file or stream (S3514). When it is determined at step 3514 that the transmitted data is the stream, the digital broadcast receiver processes the stream (S3516). In contrast, when it is determined at step 3514 that the transmitted data is the file, the digital broadcast receiver processes the file (S3515).

Then, the digital broadcast receiver controls such that an application decoder is performed according to a corresponding format (S3517). This format may be, for example, a file, stream, signaling data, or the like.

FIG. 36 is a flowchart illustrating a control method of a digital broadcast receiver and digital broadcast transmitter according to one embodiment of the present invention. With reference to FIG. 36, a detailed description will hereinafter be given of the control method of the digital broadcast receiver and digital broadcast transmitter according to one embodiment of the present invention.

The digital broadcast transmitter according to one embodiment of the present invention generates control data required to decrypt a service included in an ensemble that is a virtual channel group of mobile service data (S3601) and transmits the generated control data over an FIC (S3602). At this time, each parade carrying the ensemble and control data corresponding to the parade may be transmitted over the same time slot.

On the other hand, the digital broadcast receiver according to one embodiment of the present invention receives a broadcast signal into which mobile service data and main service data are multiplexed (S3603) and extracts transmission parameter channel (TPC) signaling information and fast information channel (FIC) signaling information from a data group in the received mobile service data (S3604).

Also, the digital broadcast receiver acquires control data required to decrypt a service included in an ensemble, which is a virtual channel group of the received mobile service data, using the extracted FIC signaling information (S3605). Of course, the service was encrypted. Then, the digital broadcast receiver controls such that the encrypted service is decrypted, using the acquired control data (S3606).

For reference, the step 3605 may further include checking the value of a field (the 'EMM_CA_ID' field or 'ECM_CA_ID' field in FIG. 28) identifying first control data defined in the payload of an FIC segment, among the FIC signaling information, determining whether the value of a field (the 'CA_ID' field in FIG. 27) identifying at least one control data defined in the header of the FIC segment is the same as the value of the field (the 'EMM_CA_ID' field or 'ECM_CA_ID' field in FIG. 28) identifying the first control data defined in the payload of the FIC segment, recognizing the control data included in the FIC segment as the first control data (EMM or ECM) upon determining that the values are the same, and acquiring the recognized first control data (EMM or ECM).

Here, a design may be made such that the following steps are carried out prior to the checking step. This will be more readily understood from the description of FIG. 35.

That is, prior to the checking step, the digital broadcast receiver according to one embodiment of the present invention decodes an RS frame to detect an SMT therefrom, and extracts an MH TP using the detected SMT. Then, the digital broadcast receiver determines using a type_indicator field of the extracted MH TP whether the MH TP carries an IP datagram. Upon determining that the MH TP carries the IP datagram, the digital broadcast receiver determines using a CA_INDICATOR field of the FIC segment payload whether a service corresponding to a virtual channel defined in the FIC segment payload was encrypted.

As described above, according to one embodiment of the present invention, it is possible to provide a digital broadcast receiver which is robust against a channel variation and noise, and a control method thereof.

Further, according to another embodiment of the present invention, it is possible to readily implement a function of setting or releasing a conditional access to a specific service in a mobile digital broadcasting environment. For example, control data required for decryption of an encrypted service may be transmitted over an FIC, thereby significantly reducing a time delay resulting from the encrypted service upon a channel change or turning-on of a digital broadcast receiver.

The present method invention can be implemented in the form of program commands executable by a variety of computer means, and recorded on a computer-readable recording medium. The computer-readable recording medium can include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that can be executed by a computer using an interpreter, etc., as well as machine language codes such as those produced by a compiler. The above-stated hardware devices can be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description.

Therefore, the scope of the present invention should not be limited to the description of the exemplary embodiments and should be determined by the appended claims and their equivalents.

What is claimed is:

1. A method of transmitting a broadcast signal in a transmitter, the method comprising:
   multiplexing mobile data and main data; and
   transmitting a transmission frame including the multiplexed mobile data and main data, wherein a parade of data groups is transmitted during slots within the transmission frame, the slots being basic time periods for multiplexing of the mobile data and the main data, wherein each of the data groups includes the mobile data, signaling information and regularly spaced known data sequences, wherein the signaling information includes fast information channel (FIC) data having binding information between a service of the mobile data and an ensemble and transmission parameter channel (TPC) data indicating a version of the FIC data, wherein the FIC data is divided into a plurality of FIC segments, and each of the FIC segments includes an FIC segment header and is transmitted in each of the data groups, wherein the FIC segment header includes an error indicator indicating whether or not an error is detected in a corresponding FIC segment, wherein the ensemble includes the service and a signaling table describing the service, and wherein the ensemble is RS-CRC (Reed Solomon-cyclic redundancy check) encoded through a 2-dimensional Reed-Solomon (RS) frame, and each row of a payload of the RS frame includes a transport packet of the mobile data.

2. The method of claim 1, wherein, when a value of the error indicator is equal to 0 (zero), the error indicator indicates that no error is detected in the corresponding FIC segment, and, when the value of the error indicator is equal to 1, the error indicator indicates that an error is detected in the corresponding FIC segment.

3. The method of claim 1, wherein the signaling table includes a service map table (SMT) which provides Internet Protocol (IP) address information and IP component level information for the service.

4. A method of receiving a broadcast signal in a receiver, the method comprising:
   receiving a broadcast signal including a transmission frame, wherein a parade of data groups in the broadcast signal is received during slots within the transmission frame, the slots being basic time periods for multiplexing of mobile data and main data, and wherein each of the data groups includes the mobile data, signaling information and regularly spaced known data sequences,
   demodulating the received broadcast signal and obtaining, from the signaling information, fast information channel (FIC) data including binding information between a service of the mobile data and an ensemble and transmission parameter channel (TPC) data indicating a version of the FIC data, wherein the FIC data is divided into a plurality of FIC segments, and each of the FIC segments includes an FIC segment header and is received in each of the data groups, wherein the FIC segment header includes an error indicator indicating whether or not an error is detected in a corresponding FIC segment, and wherein the ensemble includes the service and a signaling table describing the service;
   building a Reed-Solomon (RS) frame corresponding to the ensemble by collecting a plurality of data portions which are mapped to the data groups; and
   decoding the RS frame, wherein the RS frame is a 2-dimensional data frame through which the ensemble is RS-CRC (Reed Solomon-cyclic redundancy check) encoded, and each row of a payload of the RS frame includes a transport packet of the mobile data.

5. The method of claim 4, wherein, when a value of the error indicator is equal to 0 (zero), the error indicator indicates that no error is detected in the corresponding FIC segment, and, when the value of the error indicator is equal to 1, the error indicator indicates that an error is detected in the corresponding FIC segment.

6. The method of claim 4, wherein the signaling table includes a service map table (SMT) which provides internet protocol (IP) address information and IP component level information for the service.

7. An apparatus for transmitting a broadcast signal, the apparatus comprising:
   a multiplexer configured to multiplex mobile data and main data; and
   a transmission unit configured to transmit a transmission frame including the multiplexed mobile and main data, wherein a parade of data groups is transmitted during slots within the transmission frame, the slots being basic time periods for multiplexing of the mobile data and the main data, wherein each of the data groups includes the mobile data, signaling information and regularly spaced known data sequences, wherein the signaling information includes fast information channel (FIC) data having binding information between a service of the mobile data and an ensemble and transmission parameter channel (TPC) data indicating a version of the FIC data, wherein the FIC data is divided into a plurality of FIC segments, and each of the FIC segments includes an FIC segment header and is transmitted in each of the data groups, wherein the FIC segment header includes an error indicator indicating whether or not an error is detected in a corresponding FIC segment, wherein the ensemble includes the service and a signaling table describing the service, and wherein the ensemble is RS-CRC (Reed Solomon-cyclic redundancy check) encoded through a 2-dimensional Reed-Solomon (RS) frame, and each row of a payload of the RS frame includes a transport packet of the mobile data.

8. The apparatus of claim 7, wherein when a value of the error indicator is equal to 0 (zero), the error indicator indicates that no error is detected in the corresponding FIC segment, and, when the value of the error indicator is equal to 1, the error indicator indicates that an error is detected in the corresponding FIC segment.

9. The apparatus of claim 1, wherein the signaling table includes a service map table (SMT) which provides internet protocol (IP) address information and IP component level information for the service.

10. An apparatus for receiving a broadcast signal, the apparatus comprising:
    a receiver configured to receive a broadcast signal including a transmission frame, wherein a parade of data groups is received during slots within the transmission frame, the slots being time periods for multiplexing of mobile data and main data, and wherein each of the data groups includes the mobile data, signaling information and regularly spaced known data sequences, a demodulator configured to demodulate the received broadcast signal and obtaining, from the signaling information, fast information channel (FIC) data including binding information between a service of the mobile data and an ensemble, and transmission parameter channel (TPC) data having a version of the FIC data, wherein the FIC data is divided into a plurality of FIC segments, and each of the FIC segments including an FIC segment header is received in each of the data groups, and wherein the FIC segment header includes an error indicator indicating whether or not an error is detected in a corresponding FIC segment, and wherein the ensemble includes the service and a signaling table describing the service; and an RS frame decoder configured to build a Reed-Solomon (RS) frame corresponding to the ensemble by collecting a plurality of data portions to which the data groups are mapped and decode the built RS frame, wherein the RS frame is a 2-dimensional data frame through which the ensemble is RS-CRC (cyclic redundancy check) encoded, and a row of a payload of the RS frame includes a transport packet of the mobile data.

11. The apparatus of claim 10, wherein, when a value of the error indicator is equal to 0 (zero), the error indicator indicates that no error is detected in the corresponding FIC segment, and, when the value of the error indicator is equal to 1, the error indicator indicates that an error is detected in the corresponding FIC segment.

12. The apparatus of claim 10, wherein the signaling table includes a service map table (SMT) which provides internet protocol (IP) address information and IP component level information for the service.

* * * * *